United States Patent
Wissenbach et al.

(10) Patent No.: US 10,469,751 B2
(45) Date of Patent: *Nov. 5, 2019

(54) SMART STABILIZATION AND REORIENTATION FOR AN OMNIDIRECTIONAL CAMERA

(71) Applicant: Garmin Switzerland GmbH, Schaffhausen (CH)

(72) Inventors: David S. Wissenbach, Tempe, AZ (US); Brian Lipkowitz, Ionia, MI (US); Jerad P. Hesla, Olathe, KS (US)

(73) Assignee: Garmin Switzerland GmbH (CH)

( * ) Notice: Subject to any disclaimer, the term of this patent is extended or adjusted under 35 U.S.C. 154(b) by 225 days.

This patent is subject to a terminal disclaimer.

(21) Appl. No.: 15/594,450

(22) Filed: May 12, 2017

(65) Prior Publication Data

US 2018/0332226 A1   Nov. 15, 2018

(51) Int. Cl.
| | | |
|---|---|---|
| *H04N 5/77* | (2006.01) | |
| *H04N 5/907* | (2006.01) | |
| *H04N 5/232* | (2006.01) | |
| *H04N 9/82* | (2006.01) | |
| *G01S 19/13* | (2010.01) | |

(52) U.S. Cl.
CPC ......... *H04N 5/23267* (2013.01); *G01S 19/13* (2013.01); *H04N 5/23238* (2013.01); *H04N 5/23258* (2013.01); *H04N 5/77* (2013.01); *H04N 5/772* (2013.01); *H04N 5/907* (2013.01); *H04N 9/8205* (2013.01)

(58) Field of Classification Search
None
See application file for complete search history.

(56) References Cited

U.S. PATENT DOCUMENTS

| | | | |
|---|---|---|---|
| 9,082,187 B1 | 7/2015 | Bledsoe | |
| 9,998,664 B1* | 6/2018 | Long | G06T 3/005 |
| 2011/0115979 A1* | 5/2011 | Aoki | H04N 7/16 |
| | | | 348/602 |
| 2012/0206565 A1* | 8/2012 | Villmer | H04N 1/00 |
| | | | 348/36 |
| 2016/0234438 A1* | 8/2016 | Satoh | G06T 3/0018 |
| 2017/0132480 A1* | 5/2017 | Han | H04N 5/247 |

(Continued)

OTHER PUBLICATIONS

U.S. Appl. No. 15/594,465, filed May 12, 2017, Hesla.

(Continued)

*Primary Examiner* — Reza Aghevli
(74) *Attorney, Agent, or Firm* — Samuel M. Korte; Max M. Ali

(57) ABSTRACT

An omnidirectional camera is disclosed that records spherical video associated with a particular focal direction while in motion. The omnidirectional camera may implement one or more sensors and location-determining components to facilitate the recorded spherical video being subsequently correlated to an orientation and location of the omnidirectional camera during recording in a time-wise fashion to provide several enhancements during playback. These enhancements include reorienting the spherical video to a new focal direction. Data derived from the one or more sensors and location-determining components may be further utilized to overlay graphical objects onto the spherical video during playback to provide additional feedback.

20 Claims, 12 Drawing Sheets

(56) References Cited

U.S. PATENT DOCUMENTS

| | | | | |
|---|---|---|---|---|
| 2017/0188005 A1* | 6/2017 | Fink | ..................... | H04N 5/2258 |
| 2017/0244884 A1* | 8/2017 | Burtey | .................... | G06F 3/011 |
| 2017/0339392 A1* | 11/2017 | Forutanpour | ........ | H04N 13/161 |
| 2017/0345136 A1* | 11/2017 | Van der Auwera | ..... | G06T 5/006 |
| 2018/0115706 A1* | 4/2018 | Kang | ................. | H04N 5/23238 |
| 2018/0146216 A1* | 5/2018 | Chang | ................ | H04L 65/4076 |

OTHER PUBLICATIONS

Printout from https://en.wikipedia.org/360-degree_video dated prior to May 12, 2017.
Printout from https://code.facebook.com/posts/1638767863078802/under-the-hood-building-360-video/ dated prior to May 12, 2017.
Printout from http://research.microsoft.com/en-us/um/redmond/projects/hyperlapse/ dated prior to May 12, 2017.
Printout from http://360rumors.com/2017/04/not-joke-insta360-demonstrates-realtime-image-stabilization-360-live-streaming.html dated prior to May 12, 2017.
Printout from https://www.youtube.com/watch?v=2Zp4NRB4uco dated prior to May 12, 2017.

\* cited by examiner

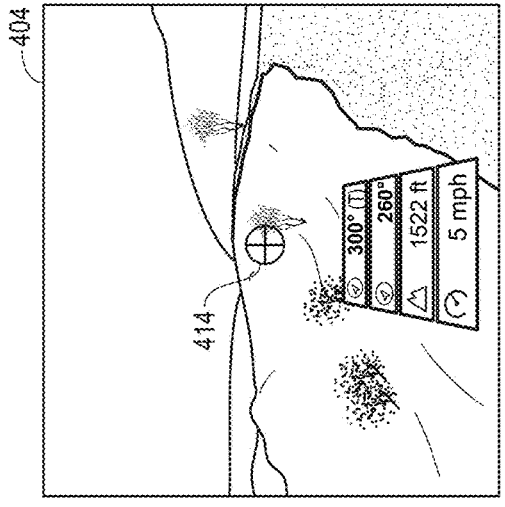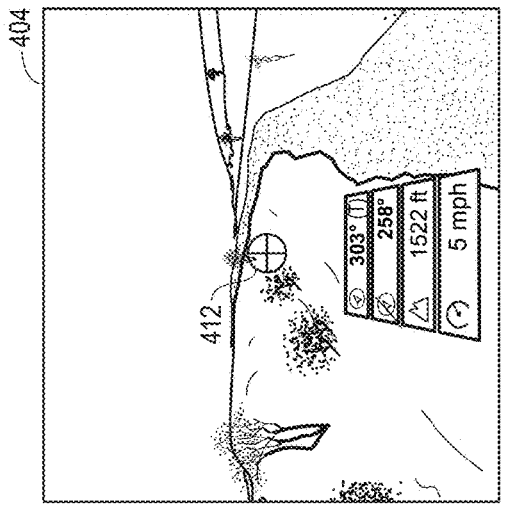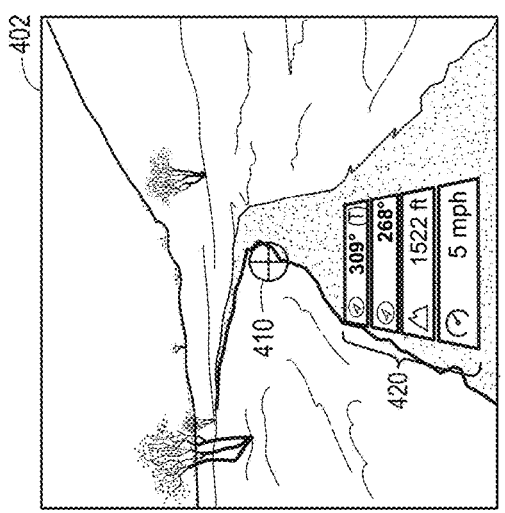
FIG. 4A  FIG. 4B  FIG. 4C
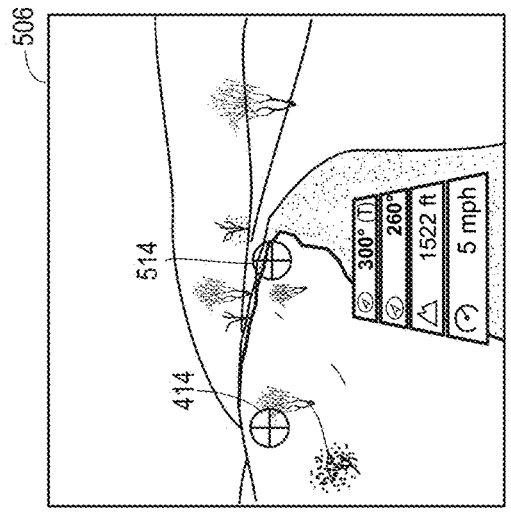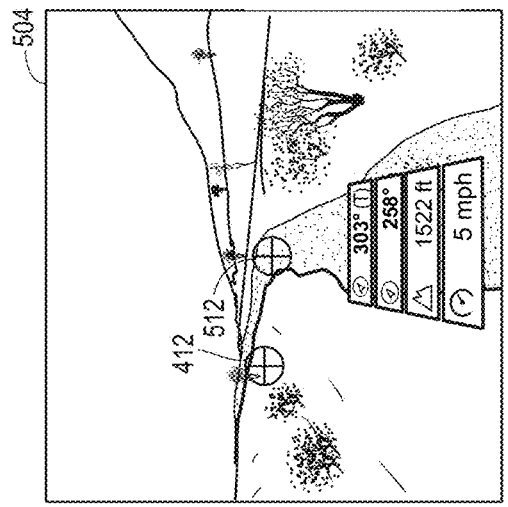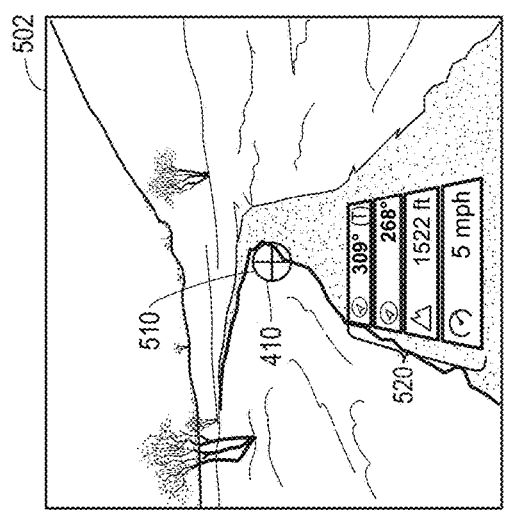
FIG. 5A  FIG. 5B  FIG. 5C

SMART STABILIZATION AND REORIENTATION FOR AN OMNIDIRECTIONAL CAMERA

TECHNICAL FIELD

The present disclosure relates generally to omnidirectional cameras and, more particularly, to an omnidirectional camera that records video that is played back in an enhanced manner.

BACKGROUND

Omnidirectional, "360-degree," or "3-dimensional" cameras are often used to capture spherical video footage. As the name implies, omnidirectional cameras may capture spherical video in every direction from a particular point of reference, such as a user wearing the omnidirectional camera or a particular object to which the omnidirectional camera is mounted, at a particular moment in time. To do so, conventional omnidirectional cameras typically include two or more separate camera units, with each having a respective field of view and being oriented to point in different directions. For example, a conventional omnidirectional camera may include two cameras orientated (position and direction) back-to-back, each recording video over a 180-degree field of view (when viewed from above the omnidirectional camera) corresponding to an approximate hemispherical shape and collectively over a 360-degree field of view corresponding to a spherical shape. After the video footage is recorded by each camera, image processing is applied to the separately recorded video footage to form a coalesced spherical video that represents spherical video footage of an event.

Often, when the spherical video is played back on a two-dimensional (flat) display screen, a user may interact with the spherical video via a user interface to pan the video to different portions of the spherical video. In other words, although the spherical video includes captured video in every direction around the omnidirectional camera, it is generally presented as two-dimensional equirectangular video frames that have a field of view associated with a single focal direction, which is a center point of an equirectangular video frame having a substantially narrower field of view than that of the overall spherical video itself. Often times, the playback utilizes a default focal direction corresponding to the orientation of the omnidirectional camera and the field of view associated with the default focal direction.

For example, an omnidirectional camera may be mounted to a helmet worn by a user engaged in an event for which the user desires to capture video footage, and the omnidirectional camera may include two camera units oriented back-to-back. The omnidirectional camera may be oriented such that a first camera unit has a focal direction directed forward such that it is pointing in the same direction as the user's eyes (i.e., the omnidirectional camera turns as the user's head turns up or down and/or to a left or right side), while the second camera unit has a focal direction that is rotated 180-degrees from the first camera unit. Thus, the focal direction and field of view of the omnidirectional camera may be locked to the user's head movements such that the captured spherical video is presented with the corresponding focal direction and field of view when played back.

As a result, the spherical video may be played back from a first-person perspective (of the user when the video footage was recorded) and may also include erratic movements depending on the user's overall motion during video recording. Thus, the field of view presented during playback corresponds to the user's head movements and changes in direction, and often deviates from the user's direction of travel. This conventional playback technique may result in causing valuable footage to be out of view during playback unless a user manually pans the spherical video to a region that is of interest. As a result, current omnidirectional camera systems and playback techniques have several drawbacks.

SUMMARY

The present disclosure is directed to technology that encompasses omnidirectional recording, video processing, and video playback. In an embodiment, the omnidirectional camera may include one or more camera units configured to capture video while the omnidirectional camera is worn by a user or is otherwise mounted to a movable object. The omnidirectional camera may also include a location-determining component configured to generate geographic location data to track the location of the omnidirectional camera, and a sensor array configured to generate sensor data indicative of an orientation of the omnidirectional camera.

The camera unit may generate a data file that correlates the geographic location data and the sensor data to individual spherical video frames captured by the camera unit. The data file may thus identify a geographic location and orientation of the camera unit for each of the individual spherical video frames. In embodiments, the data file and the spherical video file may be one file. A processor unit of the omnidirectional camera may process the data file and the captured spherical video to generate a reoriented spherical video file that reorients the captured spherical video by determining a second focal direction aligned with the movement of the omnidirectional camera along the direction of travel while the spherical video was captured. This second focal direction may be based on the identified geographic location and orientation of the camera unit for each of the individual spherical video frames.

In embodiments, the captured video may be post-processed (after the spherical video has been exported from the omnidirectional camera to an external computing device) to generate different spherical video files. In one embodiment, a reoriented spherical video file is generated that reorients the captured spherical video to a field of view and a focal direction that are different than those of the originally-captured spherical video. To accomplish this, the processor unit determines a focal direction that is aligned with the movement of the omnidirectional camera along the omnidirectional camera's direction of travel as the spherical video was captured. This direction of travel may be determined using the identified geographic location and orientation of the camera unit at each of the spherical video frames while the spherical video was recorded.

Additionally, by leveraging the geographic location data and/or the sensor data, the spherical video may be reoriented to a second focal direction and maintained in the second focal direction such that the spherical video is "locked" to the second focal direction and a field of view corresponding to the second focal direction. For instance, the second focal direction may correspond to a fixed direction or plane of reference while being played back, such as the location of a particular landmark, the horizon, or the omnidirectional camera's direction of travel when the video footage was recorded. The omnidirectional camera may correlate spherical video frames associated with a particular focal direction or other fixed direction (e.g., north) such that the spherical video is presented having a field of view associated with this direction. Thus, the locked spherical video file may be generated by reorienting the focal direction of the originally captured spherical video file to the second focal direction.

In yet another embodiment, a stabilized spherical video file is generated that stabilizes the originally captured spherical video. In doing so, the stabilized spherical video file filters out motion effects and transients. This may be accomplished by utilizing several image stabilization iterations in combination with data interpolation and/or derivation.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

FIGS. 4A-4C illustrate examples of spherical video frames without the focal direction of the omnidirectional camera being reoriented;

FIGS. 5A-5C illustrate examples of spherical video frames with the focal direction being reoriented to a focal direction that is associated with the omnidirectional camera's direction of travel during playback in accordance with embodiments of the technology;

DETAILED DESCRIPTION

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

A processor unit of a conventional omnidirectional camera or a computing device may playback a spherical video without reorienting a focal direction of the spherical video. For example, a traditional omnidirectional camera may be mounted to a helmet worn by a user such that a camera unit of the omnidirectional camera points towards the front of the helmet, and a spherical video may be taken while a user turns to look east while traveling north. In such a scenario, a conventional omnidirectional camera or computing device may playback the spherical video footage such that the focal direction is pointing east. Any reorientation of the spherical video footage, such as for image stabilization, does not reorient the focal direction to a different direction, such as the direction of travel (i.e., north in this example).

FIGS. 1A-1E are top-down view illustrations of several omnidirectional camera designs as known in the art. As shown in FIGS. 1A-1E, several conventional camera designs exist to facilitate what is described herein as "spherical video," "omnidirectional video," or three-dimensional video." Moreover, the embodiments described herein may be adapted to omnidirectional video that is recorded and stored, for example, via such omnidirectional camera implementations, as well as any other suitable techniques for capturing and storing omnidirectional video.

Figure 1A:
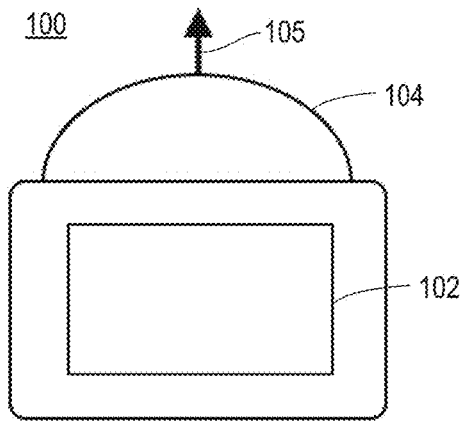
FIGS. 1A-1E are top-down view illustrations of several omnidirectional camera designs as known in the art.

Some of these conventional designs use a single camera with a wide-angle lens, such as the omnidirectional camera 100 shown in FIG. 1A. However, other omnidirectional camera designs utilize more than one camera unit, as shown in FIGS. 1B-1E. For example, camera 100, as shown in FIG. 1A, implements a single camera unit 102 with a field of view 104, which has a hemispherical or near-hemispherical shape. Such a design allows a user to record spherical video over a substantial portion of a sphere with a single camera unit. Once the video is recorded, a user may view and interact with the video via a graphical user interface to pan, rotate, and adjust the spherical video to view other regions of the video captured by the camera unit 102 having a field of view 104. A drawback to such a design, however, is that a blind spot exists directly behind the camera unit 102 in a direction opposite focal direction 105, preventing a user from recording (and thus later viewing) the recorded video over a complete spherical region centered about camera unit 102.

Figure 1B:
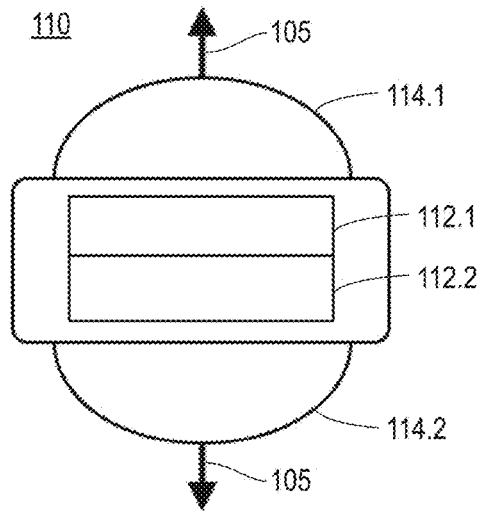
Figure 1C:
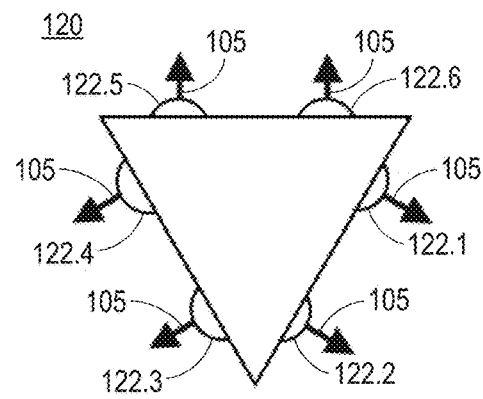
Figure 1D:
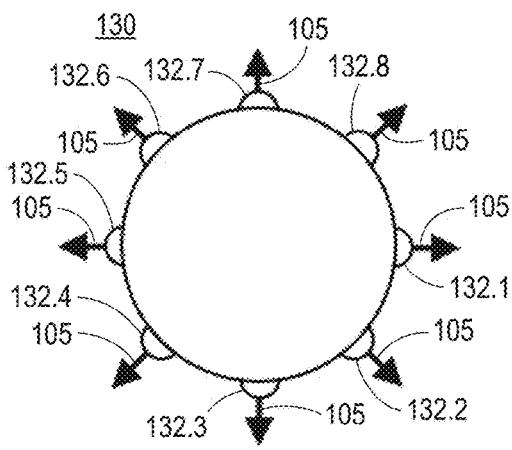

To remedy this, other omnidirectional camera designs, such as those shown in FIGS. 1B-1D, implement two or more camera units. These types of omnidirectional cameras typically include video processing software to "stitch" together video footage captured from each individual camera unit into a cohesive spherical video. For example, omnidirectional camera 110, as shown in FIG. 1B, includes two camera units 112.1 and 112.2 oriented back-to-back, each having a respective field of view 114.1, 114.2 relative to a focal direction 105, and each being configured to operate independent of one another.

Figure 1E:
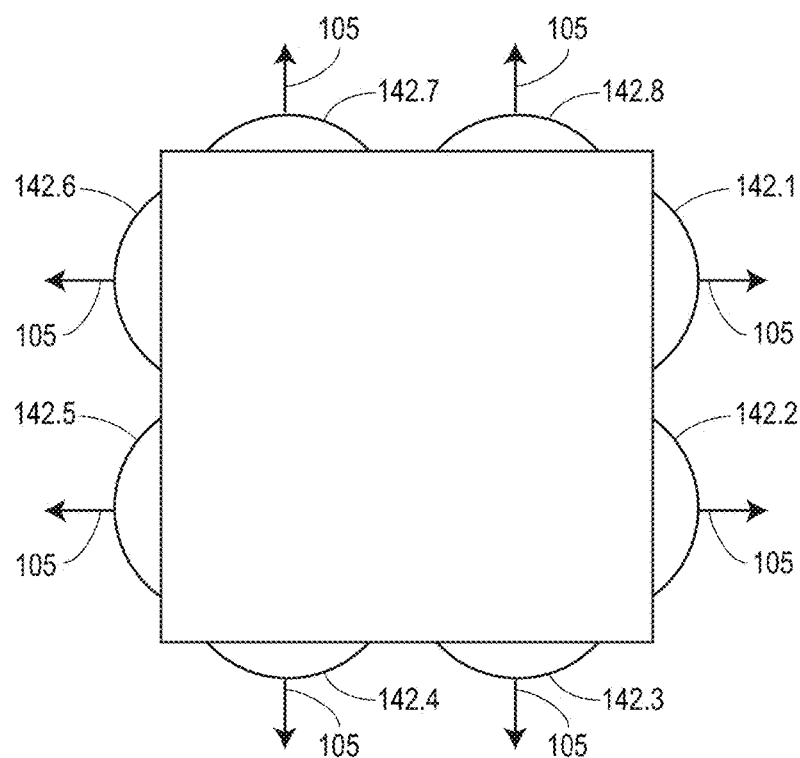

Similarly, FIGS. 1C and 1E show examples of omnidirectional cameras 120 and 140, respectively, each including several camera faces (sides), with each camera face having two camera units disposed thereon and having a common focal direction 105. In the example shown in FIG. 1C, omnidirectional camera 120 may include three camera faces with 6 total camera units 122.1-122.6. In the example shown in FIG. 1E, omnidirectional camera 140 may include four camera faces with 8 total camera units 142.1-142.8. Similar omnidirectional camera designs may include any number of faces M, for a total number of camera units equal to 2 M. One of these camera units may correspond to a "left" viewpoint, while the other camera unit may correspond to a "right" viewpoint, resulting in the captured omnidirectional video providing additional depth of view when played back (three-dimensional effect).

Moreover, the omnidirectional camera 130, as shown in FIG. 1D, may include a continuous, curved camera face having 8 total camera units 132.1-132.8, although similar omnidirectional designs may include any number of camera units 132.1-132.N disposed aligned along the same plane, with each camera unit 132.1-132.N individually recording video in an field of view overlapping with adjacent camera unit(s). In other words, omnidirectional camera 130 may include a flat, wheel-like design with several camera units disposed on the outer rim of the "wheel." However, this implementation, like omnidirectional camera 100, also suffers from two blind spots above and below the omnidirectional camera 130.

Figure 1F:
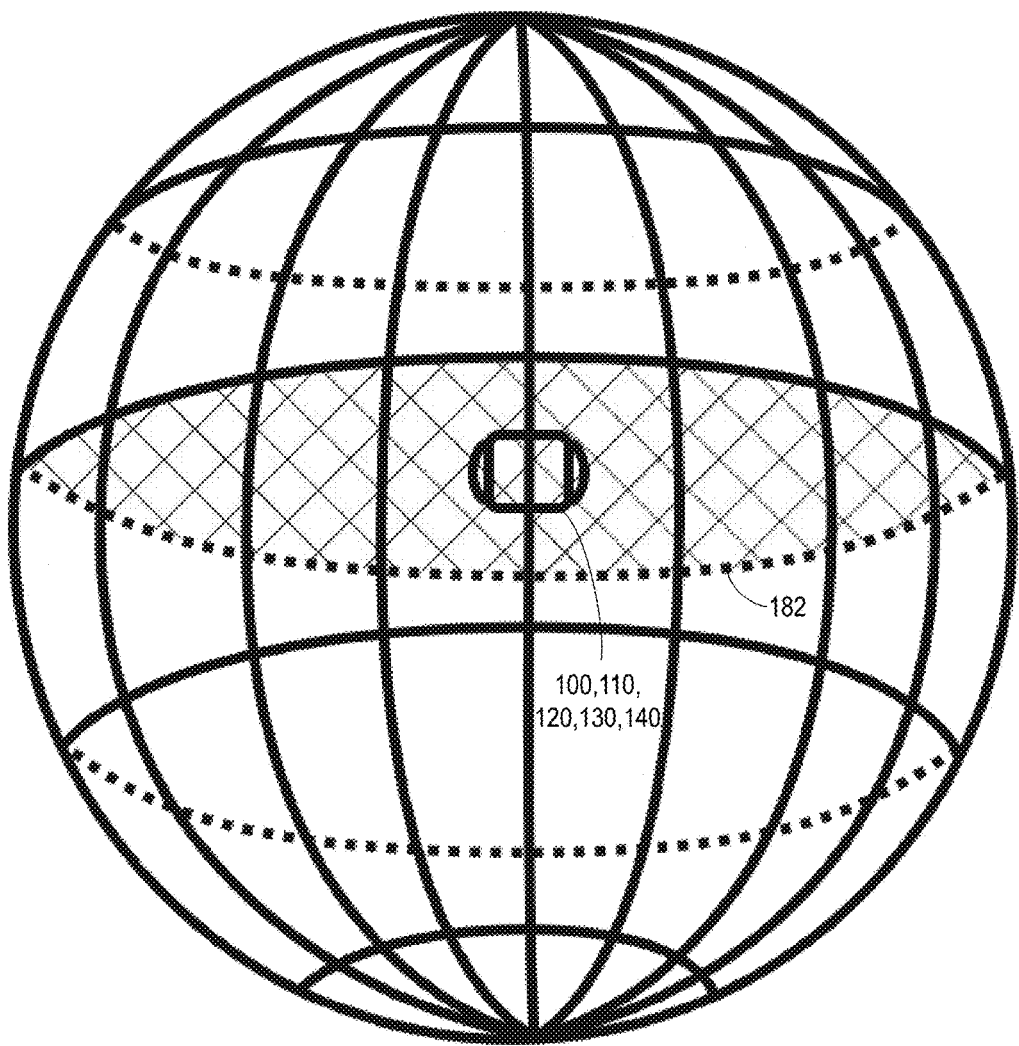
FIGS. 1F-1H are illustrations of a three-dimensional region 180 over which omnidirectional cameras capture spherical video as known in the art.

FIG. 1F is an illustration of a three-dimensional region 180 over which omnidirectional cameras capture spherical video. FIG. 1F demonstrates a three-dimensional region 180 over which the aforementioned omnidirectional cameras 100, 110, 120, 125, and 130 may record omnidirectional video. The embodiments described herein may likewise record spherical video over such a region. For instance, the three-dimensional region includes an x-y plane 182 (an "equator") within which the omnidirectional camera is centered. Thus, the acquired omnidirectional video can be thought of as a projection of video that lies along the surface of the spherically-shaped three-dimensional region 180.

Figure 1G:
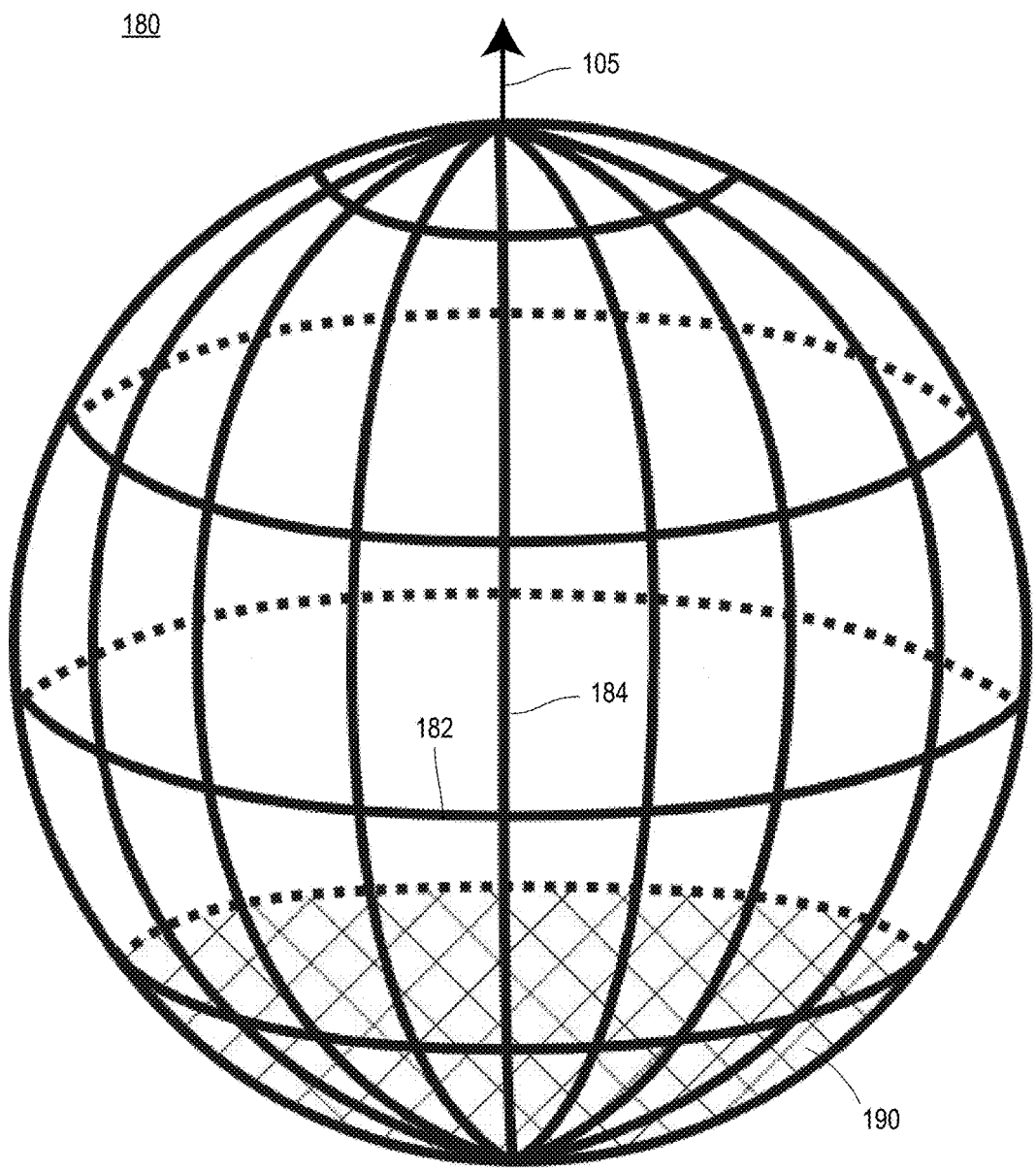
Figure 1H:
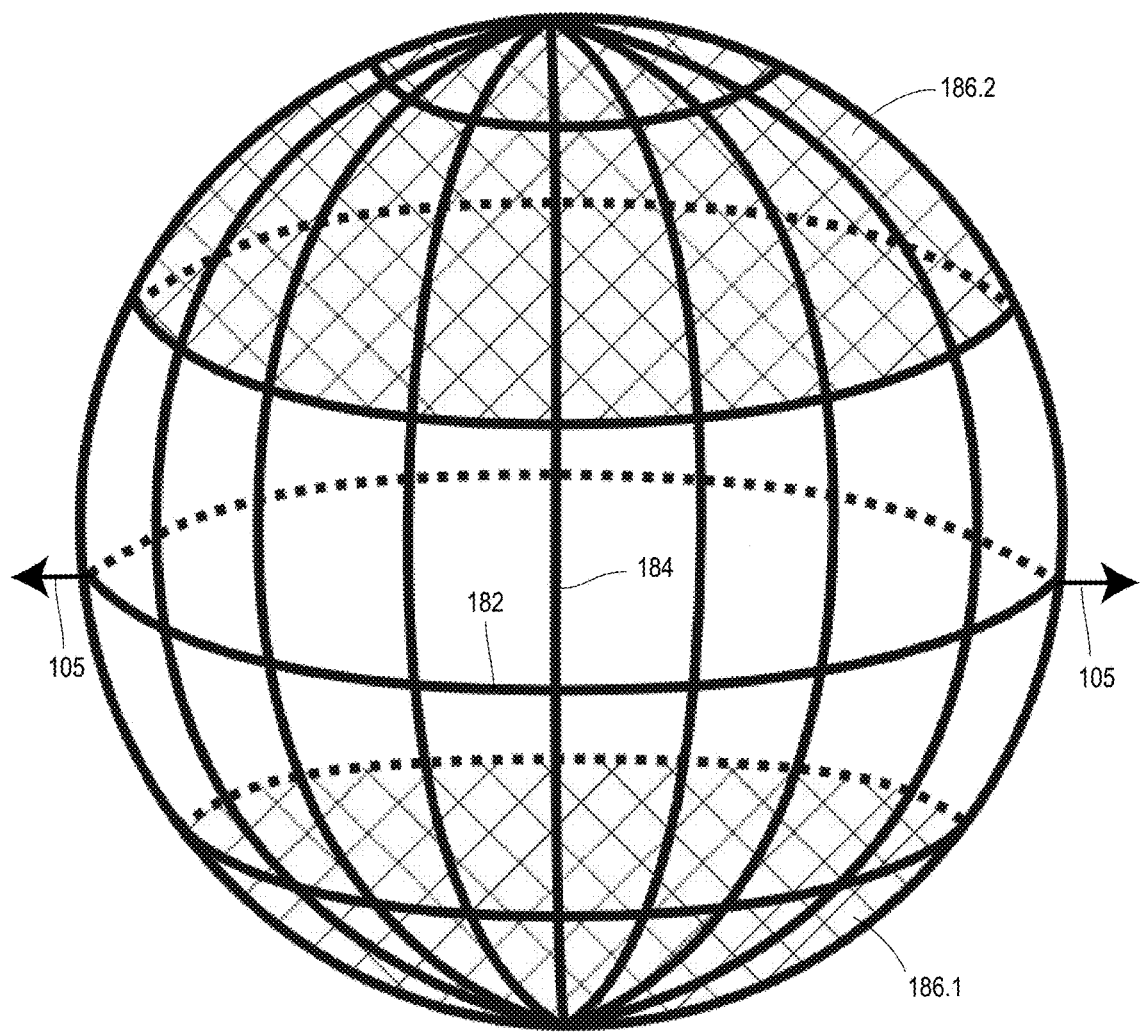

As shown in FIGS. 1G-1H, the three-dimensional region 180 may include one or more blind spots resulting in some of the aforementioned conventional omnidirectional camera implementations. For clarity, the three-dimensional region 180 shown in FIGS. 1G-1H includes the x-y plane 182 and another vertical plane 184 that is orthogonal to the x-y plane 182. The omnidirectional camera, although not shown in FIGS. 1G-1H, is presumed to be centered within each of the x-y plane 182 and the vertical plane 184 in these examples. In such a case, the omnidirectional camera 100, as shown in FIG. 1A, may have a large blind spot at the bottom of the three-dimensional region, as indicated by the shaded region 190, in a direction opposite focal direction 105 of the omnidirectional camera 100's camera unit. Moreover, the omnidirectional camera 130, as shown in FIG. 1D, may have two blind spots at the "poles" of the three-dimensional region, as indicated by the shaded regions 186.1 and 186.2, that do not correspond to any focal direction 105.

Again, regardless of the type of the particular omnidirectional camera implementation, a processor unit of a conventional omnidirectional camera or a computing device may playback a spherical video without reorienting the spherical video's focal direction. Therefore, to address this issue, embodiments of the present invention relate to a processor unit configured to reorient a spherical video file from a first focal direction to a second focal direction that is aligned with the movement of the omnidirectional camera along a direction of travel while the spherical video was captured.

As used herein, the term "direction of travel" may be associated with various calculated directions or trajectories. For instance, the direction of travel may be a predicted direction of travel that represents a future trajectory that is calculated based upon previous geographic locations (i.e., one or more geographic locations may be extrapolated). To provide another example, the direction of travel may be averaged from among several geographic locations, which represents a calculated trajectory between two known geographic locations (i.e., one or more geographic locations may be interpolated). Thus, as used herein, the term "direction of travel," may include an instantaneous, predicted, or averaged direction travel, as the case may be.

In any event, in embodiments of the present invention, the processor unit may determine the direction of travel based on a geographic location and an orientation of an omnidirectional camera's camera unit for each of a plurality of spherical video frames. Returning to the example above, if an omnidirectional camera is mounted to a helmet worn by a user such that a camera unit of the omnidirectional camera points in front of the helmet, a spherical video taken while a user turns to look east while traveling north, a processor unit implementing embodiments of the present invention may playback the spherical video footage such that the focal direction is pointing north—in the direction of travel.

Figure 2:
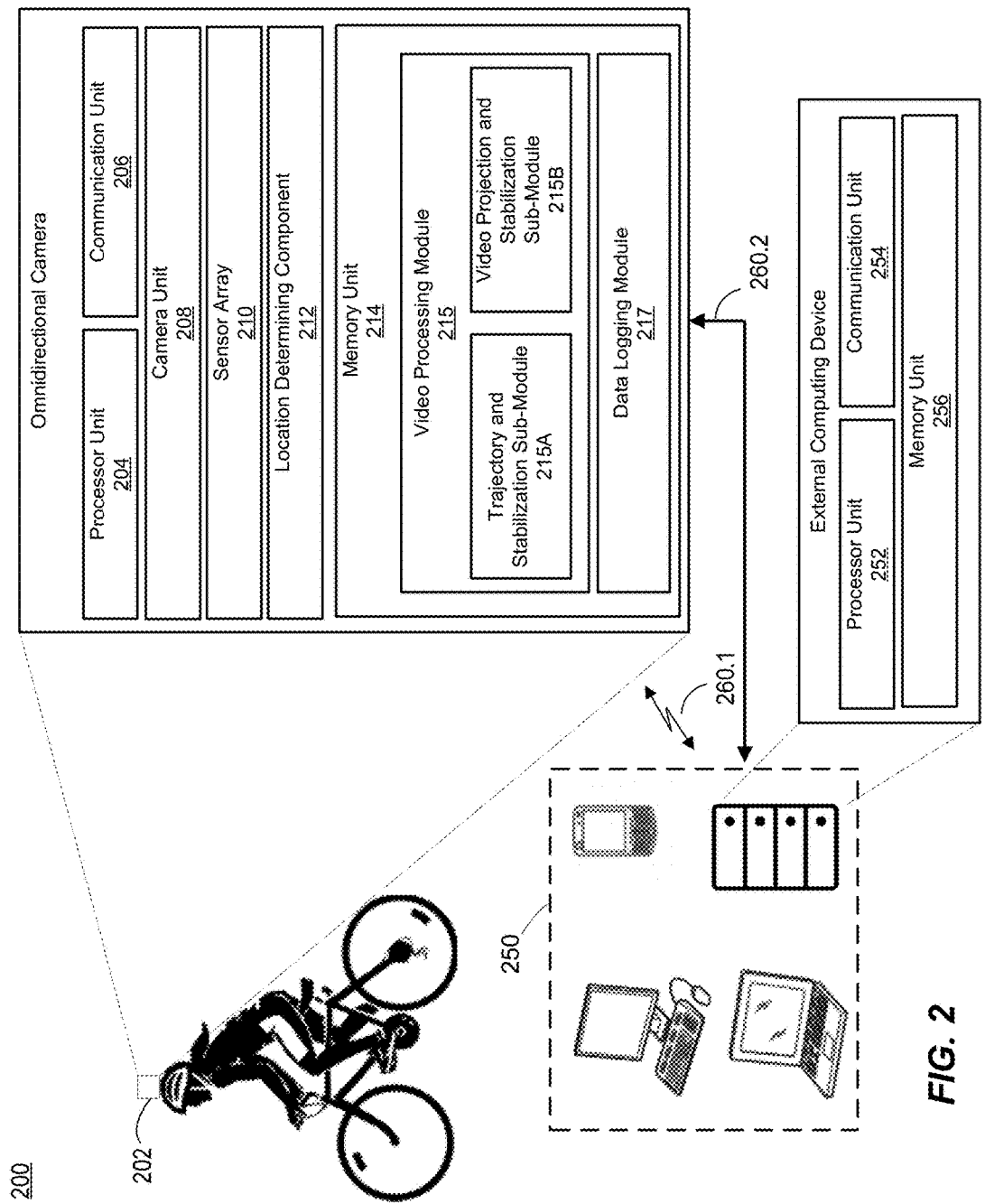
FIG. 2 is a block diagram illustrating an example omnidirectional camera environment 200 in accordance with embodiments of the technology.

FIG. 2 is a block diagram illustrating an example omnidirectional camera environment 200 in accordance with embodiments of the technology. In the example shown in FIG. 2, environment 200 includes an omnidirectional camera 202 and one or more external computing devices 250. However, in various embodiments, the functionality provided by the embodiments described herein may be implemented via a combination of omnidirectional camera 202 and one or more external computing devices 250, or exclusively via omnidirectional camera 202. Therefore, the one or more external computing devices 250 are optional and need not be present.

In an embodiment, omnidirectional camera 202 may be mounted to a person or other movable object and configured to record, store, and/or process spherical video, as further discussed below. Again, as discussed herein, the terms "spherical video," "omnidirectional video," and "360-degree video" are considered synonymous with one another and refer to video that is captured in every direction about the omnidirectional camera 202. For example, as shown in FIG. 2, omnidirectional camera 202 is mounted to a cyclist's helmet, and therefore allows the cyclist to capture spherical video that is centered about the omnidirectional camera 202. Although the omnidirectional camera 202 is shown in FIG. 2 and is often discussed herein with reference to being mounted to equipment that is worn by a cyclist, embodiments include omnidirectional camera 202 being mounted to any suitable object, particularly movable objects such as vehicles, aircraft, watercraft, bicycles, motorcycles, animals, etc. Moreover, omnidirectional camera 202 may be worn by a user participating in various sports in which it may be preferable to capture spherical video, such as while skiing, hiking, skydiving, rock climbing, hang-gliding, etc.

In embodiments in which the one or more external computing devices 250 are present, the one or more external computing devices 250 and omnidirectional camera 202 may be configured to communicate with one another via any suitable number of communication protocols, using any suitable combination of wired and/or wireless links, and in accordance with any suitable number and/or type of communication protocols. For example, the omnidirectional camera 202 and the one or more external computing devices 250 may be configured to communicate with one another via one or more wireless links 260.1, one or more wired links 260.2, or any combination thereof. To provide another example, the omnidirectional camera 202 and the one or more external computing devices 250 may be configured to communicate with one another via one or more communication networks (not shown).

In various embodiments, one or more of external computing devices 250 may include any suitable number and/or type of computing devices configured to communicate with and/or exchange data with omnidirectional camera 202. For example, one or more of external computing devices 250 may be implemented as a mobile computing device (e.g., smartphone, tablet, laptop, phablet, netbook, notebook, pager, personal digital assistant (PDA), wearable computing device, smart glasses, a smart watch or a bracelet, etc.), one or more computer servers, or any other suitable type of computing device capable of wired and/or wireless communication (e.g., a desktop computer).

As further discussed below, embodiments include omnidirectional camera 202 generating a spherical video file and one or more data files that identify a correlation between the captured spherical video and the geographic location data and sensor data generated by the omnidirectional camera 202. In embodiments, the data file and the spherical video file may be one file. As discussed herein, the geographic location data and the sensor data may be referred to as "record-time data." In embodiments, a processor unit 204 of the omnidirectional camera 202 or a processor unit 252 of an external computing device 250 coupled with a display to view a spherical video may be configured to reorient the spherical video from a first focal direction to a second focal direction based on these one or more data files to generate reoriented spherical video files. The second focal direction may correspond to the direction of travel of the omnidirectional camera when the spherical video footage was recorded. The spherical video may also be reoriented such that the second focal direction corresponds to a fixed direction and/or plane (e.g., fixed to the horizon). Moreover, regardless of the new focal direction in which the spherical video is reoriented, the record-time data may additionally or alternatively be used to stabilize the originally recorded video by removing sudden movements and/or vibrations as indicated by the geographic location data and/or the sensor data.

The one or more external computing devices 250 may receive (using a wired or wireless transfer) the spherical video file and the one or more data files to enable a user to view the spherical video file on a display associated with the one or more external computing devices 250. Although not shown in FIG. 2, the omnidirectional camera 202 may also include a suitable display, such that the spherical video file need not be transferred to the one or more external computing devices 250 and may instead be viewed locally on omnidirectional camera 202, if desired. In some embodiments, the spherical video file and the one or more data files may be stored by omnidirectional camera 202 and/or transferred to one or more of external computing devices 250 as any suitable number of files. For example, the contents of the spherical video file and the one or more data files may be integrated into a single file, which can then be transferred to external computing device 250. To provide another example, the spherical video file and the one or more data files may be stored as separate files, which can then be transferred to external computing device 250.

Embodiments include the omnidirectional camera 202, the one or more external computing devices 250, or a combination thereof, performing the processing operations to generate a playable reoriented spherical video file, as further discussed herein, which may be played back on either a display of omnidirectional camera 202 or one or more of external computing devices 250, as the case may be. For brevity, FIG. 2 illustrates omnidirectional camera 202 as including the various components to facilitate post-processing operations. However, it will be understood that the processing operations that are associated with generating the reoriented spherical video files may be performed via a processor unit of the one or more external computing devices 250 coupled with a display used to view a spherical video.

For example, an external computing device 250 may include a processor unit 252, a communication unit 254, and a memory unit 256, each of which may operate in a substantially similar or identical manner as processor unit 204, communication unit 206, and memory unit 214, respectively, of omnidirectional camera 202. Thus, processor unit 252, communication unit 254, and memory unit 256 may perform any of the embodiments described herein with respect to omnidirectional camera unit 202 in a similar or identical manner. In such a case, the omnidirectional camera 202 may transfer (export) the spherical video file and one or more data files to memory unit 256 via communication unit 206 in conjunction with communication unit 254, to thereby enable processor unit 252 to correlate the spherical video captured by omnidirectional camera 202 to geographic location data and sensor data generated by the omnidirectional camera 202 when the spherical video was recorded. In embodiments, the data file and the spherical video file may be one file. The one or more external computing devices 250 coupled with a display used to view a spherical video may then perform the processing operations discussed herein to generate one or more desired spherical video files having a second focal direction (that is different from a first focal direction corresponding to an orientation of the camera unit 206 when the spherical video was recorded). In accordance with such embodiments, the one or more external computing devices 250 may execute processing operations stored in memory unit 256 in a manner substantially similar or identical to those described herein with respect to a processor unit 204 of omnidirectional camera 202, although the sub-modules of memory unit 256 are not shown in FIG. 2 for purposes of brevity.

As shown in FIG. 2, the omnidirectional camera 202 includes a processor unit 204, a communication unit 206, a camera unit 208, a sensor array 210, a location-determining component 212, and a memory unit 214. Processor unit 204 may be implemented as any suitable type and/or number of processors, such as a host processor of omnidirectional camera 202, for example. To provide additional examples, processor unit 204 may be implemented as an application specific integrated circuit (ASIC), an embedded processor, a central processing unit associated with omnidirectional camera 202, etc. Processor unit 204 may be coupled with and/or otherwise configured to communicate, control, operate in conjunction with, and/or affect operation of one or more of communication unit 206, camera unit 208, sensor array 210, location determining component 212, and/or memory unit 214 via one or more wired and/or wireless interconnections, such as any suitable number of data and/or address buses, for example. Additionally or alternatively, one or more of communication unit 206, camera unit 208, sensor array 210, location determining component 212, and/or memory unit 214 may be coupled to or otherwise configured to operate in conjunction with one another in conjunction with or independently of processor unit 204. The interconnections used to support such interoperability amongst the various components of omnidirectional camera 202 are not shown in FIG. 2 for purposes of brevity.

Processor unit 204 may be configured to retrieve, process, and/or analyze data stored in memory unit 214, to store data to memory unit 214, to replace data stored in memory unit 214, to support one or more video analysis or processing techniques, to combine video captured from one or more camera units 208 and generate spherical video footage, to receive geographic location data generated by location determining component 212 and/or sensor data generated by sensor array 210, to log the geographic location data and/or sensor data with the spherical video as part of a correlated data file, to perform various processing operations to generate a reoriented spherical video, to control various functions of omnidirectional camera 202, etc. Additional details associated with such functions are further discussed below.

Communication unit 206 may be configured to support any suitable number and/or type of communication protocols to facilitate communications between omnidirectional camera 202 and one or more external computing devices 250. Communication unit 206 may be implemented with any suitable combination of hardware and/or software to facilitate such functionality. For example, communication unit 206 may be implemented with any number of wired and/or wireless transceivers, ports, connectors, antennas, etc. Additionally or alternatively, communication unit 206 may be configured to support communications between omnidirectional camera 202 and one or more other computing devices not shown in FIG. 2 for purposes of brevity.

For example, omnidirectional camera 202 may receive geographic location data from another component (e.g., a Global Positioning System (GPS) receiver) that is external to omnidirectional camera 202 in addition to or instead of the geographic location data generated by location-determining component 212. To provide another example, omnidirectional camera 202 may receive sensor data from one or more sensors in addition to or instead of those included as part of sensor array 210. In any event, communication unit 206 may facilitate omnidirectional camera 202 receiving data from any suitable number and type of external and/or internal components to facilitate the various functions of the embodiments as described herein.

To facilitate such communications, communication unit 206 may be configured to support communications in accordance with any suitable number and/or type of wired and/or wireless communication protocols. Examples of wireless communication standards that may be implemented by omnidirectional camera 202 include, but are not limited to, communications according to: one or more standard of the Institute of Electrical and Electronics Engineers (IEEE), such as 802.11 or 802.16 (Wi-Max) standards; Wi-Fi standards promulgated by the Wi-Fi Alliance; ZigBee standards promulgated by the ZigBee Alliance; Bluetooth standards promulgated by the Bluetooth Special Interest Group; ANT or ANT+ standards promulgated by Dynastream Innovations, Inc.; and so on.

Omnidirectional camera 202 may include a plurality and/or various types of camera units 208. For example, the camera units 208 may be positioned or oriented back-to-back or radially about a common center. To provide another example, the camera units 208 may be oriented in accordance with any of the aforementioned omnidirectional camera implementations as shown in FIGS. 1A-1E. Each camera unit 208 may be configured to capture image data and/or video data over one or more consecutive frames, including capturing live video. Each camera unit 208 may include any suitable combination of hardware and/or software such as image sensors, optical stabilizers, image buffers, frame buffers, charge-coupled devices (CCDs), complementary metal oxide semiconductor (CMOS) devices, etc., to facilitate such functionality. Each camera unit 208 may store the image and/or video data to any suitable portion of memory unit 214.

In an embodiment, omnidirectional camera 202 may include two camera units 208, each configured to concurrently capture images and/or video to facilitate the generation of a spherical video file. For example, the two camera units 208 may be positioned or disposed back-to-back such that each camera unit 208 is has a focal direction opposite to the other camera unit 208. Each camera unit 208 may thus be oriented to capture video in accordance with a respective field of view that is adjacent to (no overlap) or overlaps a field of view of the other camera unit 208, with the captured video from each camera unit 208 being stored in memory unit 214.

Sensor array 210 may be implemented as any suitable number and/or type of sensors configured to measure, monitor, and/or quantify one or more environmental characteristics. These sensor measurements may result in the acquisition and/or generation of different types of sensor data, for example, which may be processed by processor unit 204. For example, sensor array 210 may include one or more accelerometers, gyroscopes (e.g., rate gyroscopes), compasses, speedometers, magnetometers, barometers, thermometers, proximity sensors, light sensors (e.g., light intensity detectors), photodetectors, photoresistors, photodiodes, Hall Effect sensors, electromagnetic radiation sensors (e.g., infrared and/or ultraviolet radiation sensors), ultrasonic and/or infrared range detectors, humistors, hygrometers, altimeters, biometrics sensors (e.g., heart rate monitors, blood pressure monitors, skin temperature monitors), microphones, etc. Sensor array 210 may be configured to sample sensor measurements and/or to generate sensor data continuously or in accordance with any suitable recurring schedule, such as, for example, on the order of milliseconds (e.g., between 250-500 Hz), once per every second, once every 5 seconds, etc. Thus, the sensor data may be tracked and/or logged over time and stored in memory unit 214 as sensor data.

Location-determining component 212 may receive signal data transmitted by one or more position data platforms and/or position data transmitters, such as GPS satellites. More particularly, location-determining component 212 may manage and process signal data received from GPS satellites via a GPS receiver. Location-determining component 212 may thus determine a geographic position by processing the received signal data, which may include various data suitable for use in position determination, such as timing signals, ranging signals, ephemerides, almanacs, and so forth. Location-determining component 212 may be configured to continuously determine the geographic position of omnidirectional camera 202 or do so in accordance with a particular recurring schedule such as several times per second, once every second, once every 5 seconds, etc. In this way, the geographic position of omnidirectional camera 202 may be tracked and/or logged over time and stored in memory unit 214 as geographic location data.

Location-determining component 212 may also be configured to provide a variety of other position-determining functionality. Position-determining functionality, for purposes of discussion herein, may relate to a variety of different navigation techniques and other techniques that may be supported by "knowing" one or more positions. For instance, position-determining functionality may be employed to provide position/location information, timing information, speed information, and a variety of other navigation-related data. Accordingly, location-determining component 212 may be configured in a variety of ways to perform a wide variety of functions. For example, location-determining component 212 may be configured for cycling; however, location-determining component 212 may also be configured for hiking or other on-foot navigation such as skiing, or for vehicle navigation or tracking.

Although a display is not shown in FIG. 2 for purposes of brevity, location-determining component 212, for example, can use signal data received via a GPS receiver in combination with map data that is stored in memory unit 214 to generate navigation instructions (e.g., turn-by-turn instructions to an input destination or POI), show a current position on a map, and so on. Location-determining component 212 may include one or more antennas to receive signal data. Location-determining component 212 may also provide other position-determining functionality, such as to determine an average speed, calculate an arrival time, and so on.

It should be understood that a wide variety of positioning systems other than GPS may be employed, such as other satellite systems (e.g., GNSS), terrestrial based systems (e.g., wireless-phone based systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros, odometers, accelerometers and magnetometers), use of "dead reckoning" techniques, and so on. In other examples, positioning-determining functionality may be implemented through the use of predictive algorithms, utilizing previously collected positioning data for a specific path or trail.

The memory unit 214 is an example of device-readable storage media that provides storage functionality to store various data associated with the operation of the omnidirectional camera 202, such as software program and modules discussed herein, or other data to instruct the processor unit 204 and other elements of the omnidirectional camera 202 to perform the techniques described herein. Although a single memory unit 214 is shown in FIG. 2, a wide variety of types and combinations of memory may be employed. The memory unit 214 may be integral with the processor unit 204, stand-alone memory, or a combination of both. The memory unit 214 may include, for example, removable and non-removable memory elements such as random access memory (RAM), read-only memory (ROM), Flash (e.g., secure digital (SD) card, mini-SD card, micro-SD card), solid-state disk (SSD), magnetic, optical, universal serial bus (USB) memory devices, and so forth.

Moreover, in accordance with various embodiments, memory unit 214 may be a computer-readable non-transitory storage device that may include any suitable combination of volatile (e.g., a random access memory (RAM), or non-volatile memory (e.g., battery-backed RAM, FLASH, etc.). Memory unit 214 may be configured to store instructions executable on processor unit 204. These instructions may include machine readable instructions that, when executed by processor unit 204, cause processor unit 204 to perform various acts as described herein. Memory unit 214 may also be configured to store any other suitable data used in by the omnidirectional camera 202, such as the geographic location data and sensor data discussed herein, captured video from each respective camera implemented via camera unit 208, coalesced (i.e., captured) spherical video files, reoriented spherical video files, one or more data files that correlate the geographic location data and sensor data to the spherical video, spherical video files, etc. In embodiments, the data file and the spherical video file may be one file.

Video processing module 215 is a region of memory unit 214 configured to store instructions, that when executed by processor unit 204, cause processor unit 204 to perform various acts in accordance with applicable embodiments as described herein. Again, each camera unit 208 may capture and store video corresponding to a particular field of view in memory unit 214. Therefore, in an embodiment, video processing module 215 includes instructions that, when executed by processor unit 204, cause processor unit 204 to access memory unit 214 to coalesce the individual stored videos together to generate a spherical video file that combines the fields of view of the camera units 208.

For example, processor unit 204 may execute instructions stored in video processing module 215 to "stitch" the individual stored videos together to form a single spherical video. For embodiments in which two camera units 208 are oriented back-to-back, each camera unit 208 may capture video footage for a 180-degree field of view (from a top view and a side view) and processor unit 204 may combine the video footage generated by each camera unit 208 to generate a spherical video having a 360-degree field of view (from a top view and a side view). It is to be understood that the spherical video has a 360-degree field of view in a three-dimensional sense such that the spherical video includes video footage for both a lateral plane and a vertical plane, similar to the three-dimensional region 180 as shown in FIGS. 1F-1H. Video processing module 215 may store instructions to facilitate this process being performed by processor unit 204 in accordance with any suitable spherical video generation algorithm, such as via analysis of common visuals and/or audio to synchronize and link the different camera feeds together, for example.

In an embodiment, video processing module 215 includes instructions that, when executed by processor unit 204, cause processor unit 204 to derive various sensor metrics from the sensor data and/or geographic location data stored in the data file and/or to generate the various spherical video files. To do so, video processing module 215 may add raw data types to a data accumulator, which may be integrated as part of processor unit 204, for example. Video processing module 215 may then facilitate processor unit 204 re-iterating through the accumulated data to produce derived data types. Several iterations through the accumulated data may be performed when a certain type of data is initially needed to generate other various types of spherical video files for viewing, as further discussed below (e.g., to perform an "image stabilization" pass).

For example, processor unit 204 may execute a first pass through gyroscope sensor data stored in the data file to determine an average gyroscope bias. In doing so, processor unit 204 may execute instructions stored in video processing module 215 to estimate initial gyroscope bias and to function as an attitude estimator. Processor unit 204 may further integrate the 3-axis rate gyro data over time to determine attitude while correcting for rate gyro bias, gain, and absolute rotation using a 3-axis magnetometer, a 3-axis accelerometer, and GPS velocity (which may be derived from the geographic location data), thereby correcting for heading and down direction, respectively.

As further discussed below, this spherical video file has a corresponding focal direction associated with the orientation of the omnidirectional camera 202 as the video was originally recorded. For example, omnidirectional camera 202 may have a first (default or initial) focal direction that is associated with one of the camera units 208 (a primary, forward facing camera unit 208), which is typically aligned and directed in a forward direction from the cyclist's head (i.e., corresponding to the cyclist's line of sight). If camera unit 208 includes two camera units 208 positioned back-to-back, the cyclist may position omnidirectional camera 202 such that one of these camera units 208 is disposed at the front of omnidirectional camera 202 when mounted to the cyclist's helmet and oriented to capture video towards the cyclist's front hemisphere (180 degrees in front of the cyclist based on a top view). The other of these camera units 208 is disposed at the rear of omnidirectional camera 202 and oriented to capture video towards the cyclist's rear hemisphere (180 degrees in back of the cyclist based on a top view).

As a result, omnidirectional camera 202 has a first focal direction that corresponds to its physical orientation at the time the video footage was recorded. Because omnidirectional camera 202 is fixedly mounted to the cyclist's helmet in this embodiment, this first focal direction of omnidirectional camera 202 corresponds to the position and movement of cyclist's head as the cyclist turns his or her head in different directions (left or right in a lateral (azimuth) plane and/or up or down in a vertical (elevation) plane).

Conventional omnidirectional cameras and playback techniques utilize the first focal direction for spherical video generation and playback. For example, as a cyclist rides the bicycle, the cyclist may turn his or her head in a direction that deviates from the bicycle's direction of travel, causing a spherical video, when generated and played back, to correspond to and reflect such deviations. In other words, the focal direction of the spherical video may correspond to and reflect the movement of the cyclist's head while cycling at the time the video footage was recorded, which may partially be in the bicycle's direction of travel and other directions as the cyclist looks in various directions (e.g., to the left or right) while traveling forward. Embodiments of the present invention utilize different techniques for spherical video generation and playback. Examples are discussed below with reference to FIGS. 3A-3C.

In an embodiment, processor unit 204 (or a processor unit 252 of external computing device 250 coupled with a display used to view a spherical video), may facilitate playback of equirectangular video utilizing the improved techniques disclosed herein in association with any suitable video drawing algorithm, application, and/or utility. For example, embodiments include processor unit 204 (or a processor unit 252 of external computing device 250) implementing the disclosed techniques with OpenGL, DirectX, Metal, or other suitable 3D drawing application programming interface API to draw video as a texture onto the inside of a texture-mapped sphere. The equirectangular video frames may be produced as textures on a "virtual world sphere," which is an element of a 3D scene graph. Nodes in this scene graph may also compose child nodes, with each containing a textured mesh. Moreover, each object in the composite scene may apply a rotation, translation, and scale, in accordance with any suitable type of 3D applications.

Although the embodiments described herein provide several examples of the spherical video being presented in an equirectangular video forma, it is to be understood that this is one example of a projection format that may be implemented in accordance with the embodiments described herein, and is used throughout the disclosure given the ease in which this particular video format may be illustrated. However, the embodiments described herein may utilize any suitable type of projection formats to generate reoriented spherical video files, and the embodiments are not limited to image mapping techniques that rely on the use of one projection over another.

Data logging module 217 is a region of memory unit 214 configured to store instructions, that when executed by processor unit 204, cause processor unit 204 to perform various acts in accordance with applicable embodiments as described herein. In an embodiment, data logging module 217 includes instructions that, when executed by processor unit 204, cause processor unit 204 to generate a data file including various types of data. For example, the data file may store data in a format that allows processing operations to identify a geographic location and orientation of the omnidirectional camera 202 at a plurality of time instants as the spherical video was generated. In doing so, sensor array 210 and memory unit 214 of omnidirectional camera 202 may enable the determination of an orientation and interpolated trajectory of the omnidirectional camera 202 over the duration of the video recording by processor unit 204 (or processor unit 252 of external computing device 250 coupled with a display used to view a spherical video). The data file may be stored in memory unit 214 as any suitable file type and in accordance with any suitable format. For example, the data file may be stored as a Flexible Interchange (FIT) file format.

In various embodiments, data logging module 217 may store instructions to facilitate processor unit 202 storing geographic location data generated via location determining component 212, any suitable type of sensor data generated via one or more sensors of sensor array 210, and/or the generated spherical video file as part of or associated with the data file. The data file may include information correlating the geographic location data, the sensor data, and the individual spherical video frames in a time-wise (chronologically linked) manner. To provide an illustrative example, processor unit 202 may store and subsequently access geographic location data generated by location determining component 212 over a period of time corresponding to the time when the video footage was recorded. Thus, the data file may include a logged set of geographic coordinates for several instants in time throughout the duration of recording (generating) the spherical video. Each of these geographic coordinates may also be correlated with a time when the geographic location data was obtained, which may be referenced to the same clock implemented by the GPS or other GNSS receiver used to obtain the geographic location data, for example. Thus, the data file may include several geographic location data entries and the corresponding times throughout the duration of recording the spherical video when the geographic location data was sampled.

In embodiments, data logging module 217 may additionally or alternatively store instructions to facilitate processor unit 202 storing tracked sensor data throughout the duration of the spherical video recording and a correlated time of when the sensor data was sampled. For example, sensor array 210 may include, among other sensors, a 3-axis rate gyroscope, a 3-axis accelerometer, a 3-axis magnetometer, and a barometric sensor. Again, each of these sensors may generate respective sensor data in accordance with any suitable sampling schedule (e.g., 250-500 Hz). Processor unit 204 may then store the sensor data for each respective sensor as part of the data file, with a time or other suitable indication when each individual sensor data was measured. In this way, the data file may include several sensor data entries and their corresponding times throughout the duration of the spherical video recording when each video frame was recorded.

In embodiments, processor unit 204 may additionally or alternatively store a time and file message as part of the data file. This message may then be utilized by processor unit 204 to correlate and synchronize the spherical video throughout the duration of the recording to the determined geographic location and orientation of the omnidirectional camera 202 when each individual video frame was recorded. In other words, the orientation and geographic location of the omnidirectional camera 202 may be determined at a time corresponding to when each video frame was recorded (sampled or captured) by each camera unit 208 of omnidirectional camera 202. This correlation may then be stored in memory unit 214 as the spherical video file is generated, and utilized by processor unit 204 to generate the desired spherical video file (e.g., a reoriented spherical video file, a locked-orientation spherical video file, a stabilized spherical video file, etc.) as discussed herein. In embodiments, the data file and the spherical video file may be one file.

To provide an illustrative example, sensor array 210 may include various sensors configured to generate and output sensor data at various sampling rates, and these sampling rates may be faster or slower than the rate at which spherical video frames are acquired. For instance, sensor array 210 may include sensors configured to generate sensor data at 250-500 Hz, while camera unit 208 may be configured to store spherical video frames at a rate between 100-250 frames per second. Therefore, in some instances, multiple sensor data samples may be stored over the time period between successive spherical video frames, while in other instances there may be sensor data "missing" between successive spherical video frames. Furthermore, the sensor data, the geographic location data, and the video frame acquisition rates may not be synchronized to one another, although these different datasets may be correlated to one another in a time-wise manner, as discussed herein.

Therefore, embodiments include processor unit 204 providing an initial image stabilization file by functioning as a trajectory interpolator/estimator, which uses GPS position, GPS velocity, acceleration (e.g., derived from one or more accelerometers implemented via sensor array 210), and/or attitude (e.g., derived from one or more magnetometers, compasses, gyroscopes, etc., implemented via sensor array 210). As a result of the initial stabilization pass, processor unit 204 may interpolate the time-varying sensor data and the geographic location data that has been stored during, before, and/or after the spherical video recording. Once interpolated in this manner, the initial image stabilization file may indicate the changes in the direction and orientation of the omnidirectional camera 202 as a function of time throughout a spherical video recording.

Processor unit 204 may analyze this data stored in memory unit 214 to develop an estimate of the time-varying position and velocity of omnidirectional camera 202 during video recording. In embodiments, processor unit 204 may visually smooth an estimate of the time-varying position and velocity of omnidirectional camera 202 during video recording. In an embodiment, this position and velocity estimate is computed such that the spherical video file may be reoriented by processor unit 204 (or processor unit 252 of computing device 250) to enable the user to playback the spherical video based on the direction of travel, as further discussed below. In other words, the data file is processed by processor unit 204 (or processor unit 252 of external computing device 250 coupled with a display used to view a spherical video). And once processed in this manner, an initial image stabilization file is generated, which in turn may be further processed by processor unit 204 (or processor unit 252 of external computing device 250) in accordance with additional algorithms to provide the reoriented spherical video files.

The reoriented spherical video files may be either stored locally in memory unit 214 or transferred (downloaded) to one or more external computing devices 250. Thus, a user may playback (view) any one of the reoriented spherical video files in accordance with a desired playback mode, which may be selected by the user in any suitable manner. The playback modes associated with each of the reoriented spherical video files are further discussed herein, although the specific mode of selection is not shown or discussed herein for purposes of brevity.

Trajectory and stabilization sub-module 215A is a region of memory unit 214, or a memory unit 256 of an external computing device 250, configured to store instructions, that when executed by processor unit 204, cause processor unit 204 to perform various acts in accordance with applicable embodiments as described herein. In an embodiment, trajectory and stabilization sub-module 215A includes instructions that, when executed by processor unit 204, cause processor unit 204 to further process the image stabilization file after the initial image stabilization pass has been performed, as discussed above. In an embodiment, processor unit 204 may utilize the stored instructions of trajectory and stabilization sub-module 215A to analyze the sensor data and/or geographic location data in the image stabilization file to calculate an estimated orientation and interpolated trajectory of the omnidirectional camera 202 over the duration of the spherical video recording.

Once this information is calculated, processor 204 may correlate individual frames of the spherical video to an orientation of the omnidirectional camera 202 (e.g., as indicated by the logged and smoothed sensor data) along the direction of travel (e.g., as indicated by the logged and smoothed geographic location data) at each spherical video frame. In other words, processor unit 204 may interpolate the geographic location data and the sensor data over the duration of the spherical video to calculate an interpolated time-varying trajectory. This time-varying trajectory represents an orientation and movement of omnidirectional camera 202 along the direction of travel as the spherical video was recorded. From this interpolated time-varying trajectory, the orientation and the instantaneous direction of travel of omnidirectional camera 202 may be calculated for each individual spherical video frame. In turn, the reoriented spherical video file may be generated by mapping or associating individual spherical video frames to the interpolated time-varying trajectory in a time-wise (chronologically linked) manner. In this way, the initial focal direction and field of view of the original spherical video is reoriented to a new focal direction and field of view that are associated with and correspond to the direction of travel of omnidirectional camera 202.

In doing so, the resulting reoriented spherical video file, when played back by processor unit 204 (or processor unit 252 of external computing device 250 coupled with a display used to view a spherical video), is presented with respect to a focal direction that is aligned with the direction of travel of omnidirectional camera 202 when the video footage was recorded. That is, the reoriented spherical video file, when played back by processor unit 204 (or processor unit 252 of external computing device 250), results in the focal direction of the original spherical video file being moved to a calculated direction of travel of omnidirectional camera 202 based upon the mapped orientation and trajectory of the omnidirectional camera 202 during video recording. For ease of explanation, this process of reorienting the spherical video based on a direction of travel of omnidirectional camera 202 is further described below with reference to FIGS. 3A-B.

Figure 3A:
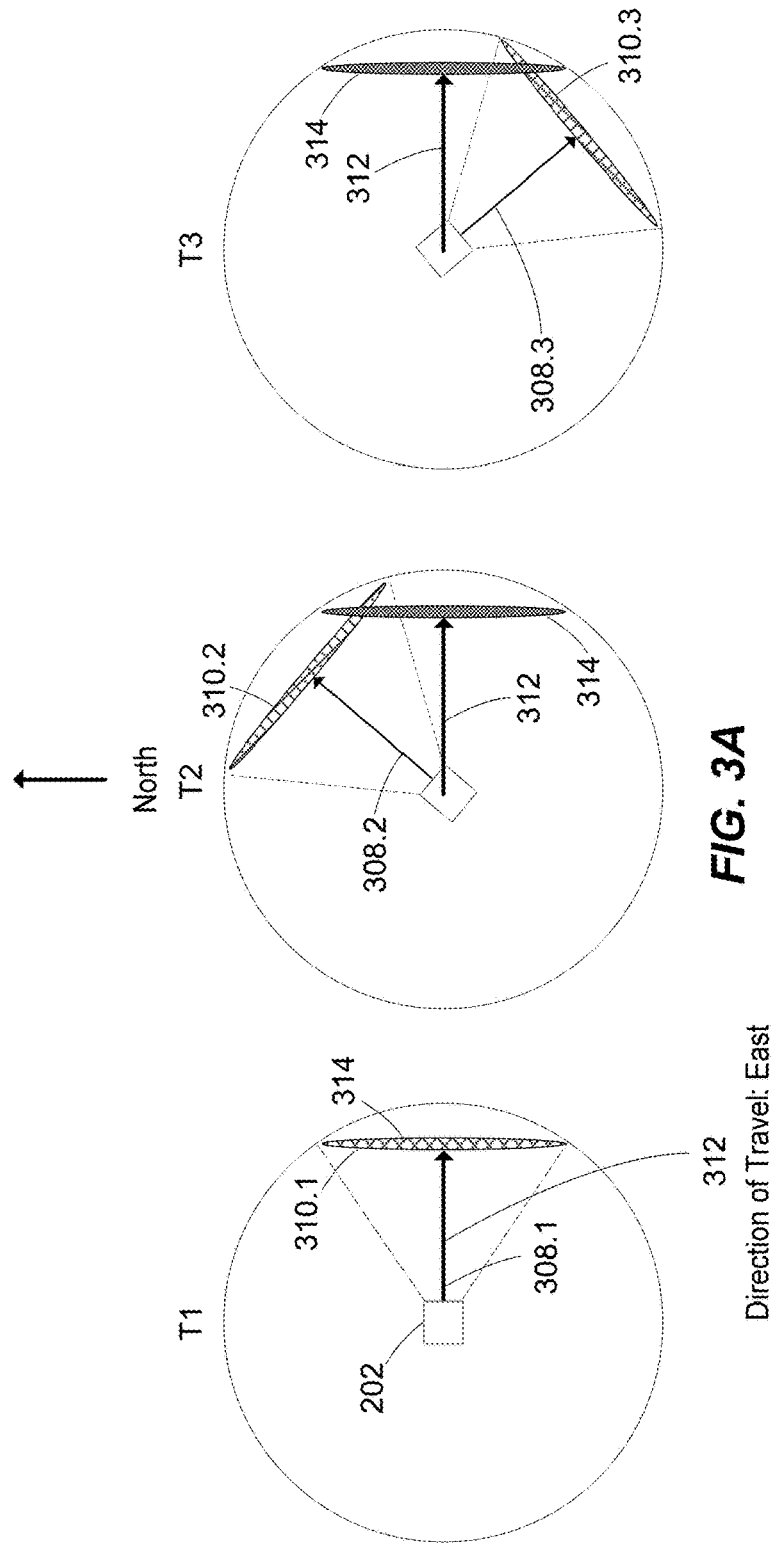
FIG. 3A-3B illustrate examples of changes in focal direction due to movement of the omnidirectional camera along a traveled path from two different perspectives in accordance with embodiments of the technology.
Figure 3B:
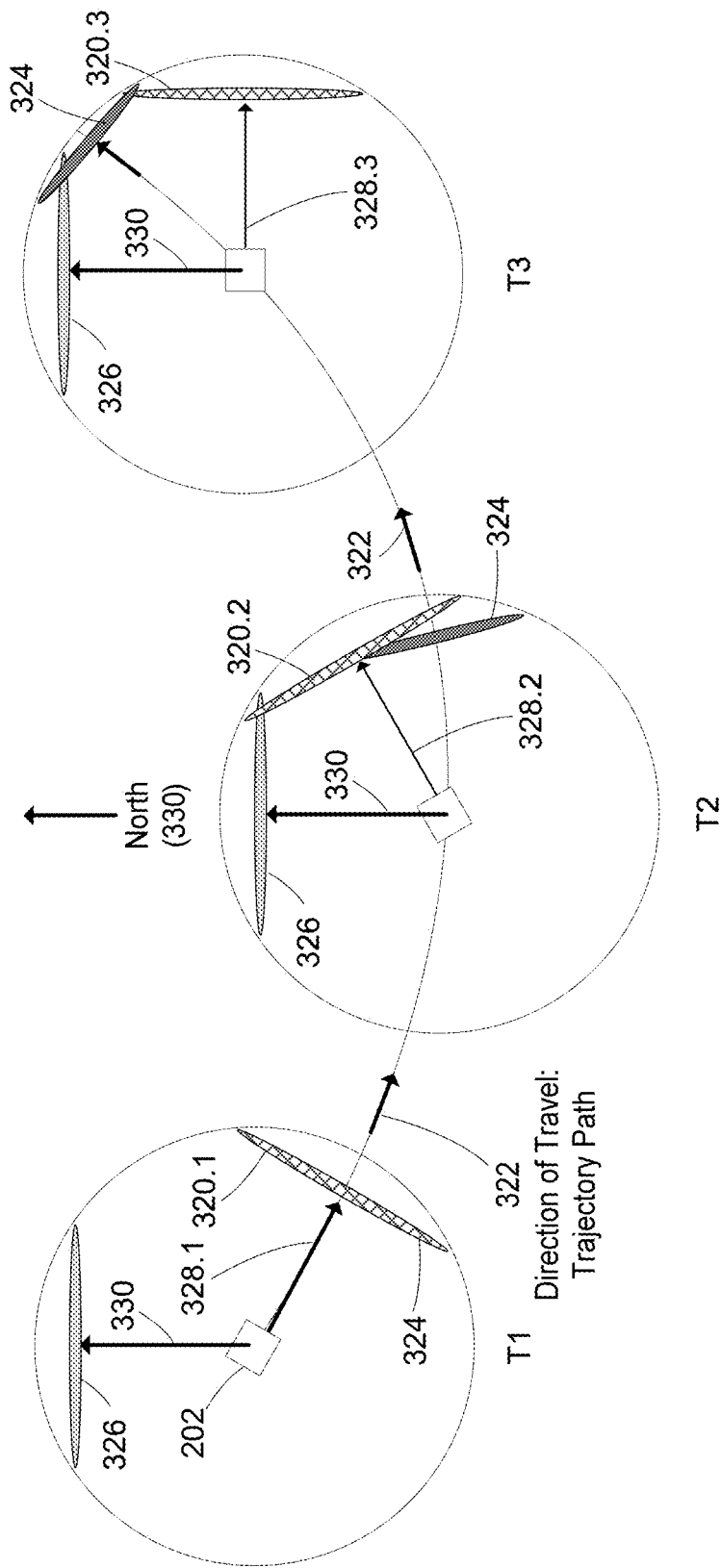

FIGS. 3A-B illustrate examples of changes in focal direction due to movement of the omnidirectional camera 202 along a traveled path from two different perspectives. Two fields of view are illustrated in each figure while a spherical video is recorded. A first field of view 310.1 (FIG. 3A) and 320.1 (FIG. 3B) associated with a first focal direction 308.1, 328.1 corresponding to an orientation of a first (primary, forward facing) camera unit 202 is illustrated in each Figure to identify the direction in which the user is looking. A second field of view 314, 324 corresponding to a direction of travel 312, 322 of omnidirectional camera 202 is illustrated to identify the deviation between where the user is looking and the direction of travel 312, 322. At each of the time instants T1-T3 shown in FIGS. 3A and 3B, omnidirectional camera 202 is assumed to be centered within a three-dimensional region over which spherical video is captured.

Thus, FIG. 3A illustrates a top-down view of omnidirectional camera 202 centered about a three-dimensional space at three different time instants, T1, T2, and T3, each representing different orientations of omnidirectional camera 202 as it moves in a direction of travel 312 for each time instant. In this example, omnidirectional camera 202 traveled east during all three time instants. If omnidirectional camera 202 is worn by a cyclist, as shown in FIG. 2, time instants T1, T2, and T3 may each represent time instants corresponding to individual spherical video frames associated with the cyclist as omnidirectional camera 202 and the bicycle traveled along a path in the direction of travel 312 while a spherical video was recorded. Although the omnidirectional camera 202 is configured to generate spherical video in an entire spherical region, the fields of view discussed below illustrate reorientation of the spherical video upon playback.

As shown in FIG. 3A, at time instant T1, the omnidirectional camera 202 is oriented in such a manner to have a respective focal direction 308.1 that is also aligned with the direction of travel 312. As a result, at time instant T1, omnidirectional camera 202 is associated with an initial field of view 310.1 that is centered about and corresponds to the focal direction 308.1, which corresponds to an orientation of the first (primary, forward facing) camera unit 208. Field of view 314 therefore corresponds to the direction of travel 312. In other words, at time instant T1, the focal direction 308.1 is aligned with the direction of travel 312 (i.e., east) and its associated field of view 310.1 is aligned with the field of view 314. Thus, at time instant T1, the fields of view 310.1 and 314 overlap with one another.

At time instant T2 of FIG. 3A, however, focal direction 308.2, which corresponds to an orientation of the first (primary, forward facing) camera unit 208 of omnidirectional camera 202 and is associated with a field of view 310.2, deviates from the direction of travel 312. Similarly, at time instant T3, focal direction 308.3, which corresponds to an orientation of the first (primary, forward facing) camera unit 208 of omnidirectional camera 202 and is associated with field of view 310.3, also deviates from the direction of travel 312. Thus, the changes in focal directions 308.1-308.3, and their respective fields of view 310.1-310.3 at each of time instants T1, T2, and T3, respectively, are the result of changes in the three-dimensional orientation of omnidirectional camera 202 and its first (primary, forward facing) camera unit 208 at each of these different time instants.

Continuing the previous example, as illustrated in FIG. 3A, a cyclist traveling in a direction of travel 312 at each of time instants T1-T3, may initially (at time instant T1) look in the direction of travel 312, with the omnidirectional camera 202 being aligned with the direction of travel 312. However, at time instant T2, the cyclist may turn his or her head up and to the left, thereby causing the omnidirectional camera 202 to no longer align with the direction of travel 312. And at time instant T3, the cyclist may then turn his or her head down and to the right, thereby causing the omnidirectional camera 202 to deviate from the previous orientation at time instant T2. In other words, as the cyclist having omnidirectional camera 202 mounted to his or helmet moves in direction of travel 312 through time instants T1-T3, the three-dimensional orientation of omnidirectional camera 202 and its camera units 208 may vary from direction of travel 312, resulting in a deviation between where the user is looking and the direction of travel 312. As a result, focal directions 308.2, 308.3 and corresponding fields of view 310.2, 310.3 no longer overlap with the direction of travel 312 and the corresponding field of view 314.

A conventional processor unit may playback the spherical video recorded over a time period including time instants T1-T3 in a video player that enables a user to view the spherical video as a sequence of equirectangular video frames. As discussed above, conventional video players enable a user to pan the spherical video during viewing (e.g., by clicking and dragging a mouse within the equirectangular video frame) to observe spherical video footage in a three-dimensional space outside of the presented equirectangular field of view. A conventional video player may playback the spherical video with equirectangular video frames at each of time instants T1, T2, and T3 presented having a focal direction that matches or corresponds to that of focal directions 308.1-308.3 (associated with a first (primary, forward facing) camera unit of an omnidirectional camera), and the respective fields of view 310.1-310.3. Thus, conventional recording and playback techniques will result in a spherical video that is played back in a manner such that the playback will reflect the user's head movements. As a result, any other movements (e.g., road bumps, up and down motion associated with running, etc.), that cause the omnidirectional camera to deviate from a direction of travel will also be reflected as changes to the field of view shown in the played back spherical video.

To address this issue, in embodiments of the present invention, omnidirectional camera 202 stores a log of sensor data and/or geographic location data for each of time instants T1-T3, and video processing module 215 stores instructions that, when executed by processor unit 204 (or processor unit of 252 of external computing device 250 coupled with a display used to view a spherical video), generate a reoriented spherical video file. In accordance with such an embodiment, processing of the spherical video includes determining a reoriented focal direction of the omnidirectional camera 202 over the duration of the spherical video recording that compensates for the aforementioned changes in the orientation of the omnidirectional camera 202. In an embodiment, this reoriented focal direction is aligned with or may correspond to the direction of travel 212, 222 associated with omnidirectional camera 202. In this way, the reoriented spherical video file allows processor unit 204 (or processor unit 252 of external computing device 250 coupled with a display used to view a spherical video), to playback the spherical video in an equirectangular format such that the focal direction and field of view match the omnidirectional camera's 202 direction of travel regardless of any changes in its orientation as the spherical video was originally recorded. As a result, a user viewing the reoriented spherical video file at each of time instances T1, T2, and T3 may view equirectangular video frames having a reoriented focal direction matching the direction of travel 312 and a respective field of view 314.

To provide another example, FIG. 3B illustrates a top-down view of omnidirectional camera 202 centered about a three-dimensional space at the same three different time instants T1, T2, and T3. To better illustrate the changes in focal direction and field of view due to changes in the orientation of omnidirectional camera 202 and the direction of travel, FIG. 3B shows the direction of travel 322 as having a curved trajectory. FIG. 3B shows the changes in the orientation of omnidirectional camera 302 while moving along a direction of travel associated with the direction of travel 322 over the three different time instants T1, T2, and T3. FIG. 3B also shows fields of view associated with three different perspectives. In particular, FIG. 3B illustrates fields of view 320.1-320.3 for each of time instants T1-T3, which correspond to focal directions 328.1-328.3, respectively, which correspond to an orientation of the first (primary, forward facing) camera unit 208. Focal directions 328.1-328.3 are associated with the orientation of the omnidirectional camera 202 at each of these respective time instants, similar to those discussed with respect to FIG. 3A for focal directions 308.1-308.3. As shown in FIG. 3B, the fields of view 324, however, are aligned with the curved direction of travel 322 throughout each of time instances T1-T3, similar to the fields of view 314 discussed above with respect to FIG. 3A.

FIG. 3B also illustrates a fixed focal direction 330 aligned with a fixed direction, in this case north, and a respective field of view 326 at each time instance T1-T3. It is to be understood that the fixed focal direction 330 may be in any direction within the three-dimensional space over which the spherical video is captured. In the example illustrated in FIG. 3B, the generated spherical video file may be the result of reorienting the spherical video file at each of time instants T1-T3 to the locked focal direction 330 or to the direction of travel 322.

FIGS. 4A-4C and 5A-5C further illustrate the application of the various processing techniques applied by processor unit 204 (or processor unit 252 of external computing device 250 coupled with a display used to view a spherical video), to the spherical video to reorient the spherical video file to a field of view to be presented in an equirectangular format based on a direction of travel. In particular, FIGS. 4A-4C illustrate examples of spherical video frames recorded and presented utilizing conventional techniques. FIGS. 5A-5C, however, illustrate examples of a reoriented spherical video frames for which the focal direction has been reoriented from a first focal direction (corresponding to an orientation the first (primary, forward facing) camera unit 208 of omnidirectional camera 202) to a different focal direction associated with a direction of travel of omnidirectional camera 202, in accordance with embodiments of the technology.

As shown in FIGS. 4A-4C, equirectangular video frames 402, 404, and 406 correspond to different fields of view of a spherical video at different time instants (similar to time instants T1, T2, and T3, for example, as discussed with respect to FIGS. 3A and 3B). Each of equirectangular video frames 402, 404, and 406 presents a respective field of view centered about a different focal direction matching or corresponding to orientations of a first (primary, forward facing) camera unit of omnidirectional camera 202. This focal direction is shown in each of equirectangular video frames 402, 404, and 406 by a respective crosshair marker 410, 412, and 414. Each crosshair marker 410, 412, and 414, therefore, represents a focal direction that is associated with the omnidirectional camera's particular orientation at each time instant. For example, assume that the equirectangular video frames 402, 404, and 406 are associated with spherical video footage captured by an omnidirectional camera worn by a cyclist riding on a bicycle trail. In this case, each focal direction, and thus the field of view represented in each of successive equirectangular video frames 402, 404, and 406, reflects the user turning her head in any direction (e.g., to the left, upwards, etc.) while riding a bicycle along the trail. Specifically, equirectangular video frame 404 indicates that the user turned her head to the left by some degree, as shown in FIG. 4B, and then equirectangular video frame 404 indicates that the user turned her head further to the left, as shown in FIG. 4C.

FIGS. 5A-5C include equirectangular video frames 502, 504, and 506, which correspond to the same time instants as equirectangular video frames 402, 404, and 406, as shown in FIGS. 4A-4C. However, equirectangular video frames 502, 504, and 506 correspond to a reoriented spherical video file generated by processor unit 204 (or processor unit 252 of computing device 250) in accordance with an embodiment. As a result, each of equirectangular video frames 502, 504, and 506 presents a respective field of view centered about a focal direction identified by crosshair markers 510, 512, and 514. However, unlike FIGS. 4A-4C, each of crosshair markers 510, 512, and 514 represents a focal direction associated with a current direction of travel of the omnidirectional camera 202 along the trail when the associated spherical video footage was recorded. To further illustrate the extent to which the spherical video has been reoriented, each of FIGS. 5A-5C also includes a respective offset crosshair marker 410, 412, and 414 from FIGS. 4A-4C. In other words, crosshair markers 410, 412, and 414, as shown in FIGS. 5A-5C, correspond to the same orientation as the crosshair markers 410, 412, and 414 shown as centered focal directions of FIGS. 4A-4C, but have been remapped within the reoriented equirectangular video frames 502, 504, and 506 in FIGS. 5A-5C. In other words, the separation between each of crosshair markers 410, 412, and 414, and 510, 512, and 514, respectively, represents a reorientation of the focal direction (and corresponding field of view) of the spherical video footage by processor unit 204 (or processor unit 252 of external computing device 250 coupled with a display used to view a spherical video).

Furthermore, embodiments include the spherical video being reoriented to a new direction utilizing another set of record-time data obtained from another device, such as another omnidirectional camera, for example. For example, an external computing device 250 may receive record-time data from two different omnidirectional cameras, with the record-time data containing sensor data and geographic location data indicating the orientation and geographic location, respectively, of each omnidirectional camera as each respective spherical video was recorded. In an embodiment, processor unit 252 associated with external computing device 250 may identify the location of the second omnidirectional camera relative to the first omnidirectional camera, and calculate a new focal direction over time that aligns with the geographic location of this second omnidirectional camera. In accordance with such embodiments, the reoriented spherical video file is then generated having a field of view that dynamically tracks the geographic location of the second omnidirectional camera (or other suitable device for which such data is available) instead of the user's (i.e., the user associated with the first omnidirectional camera) direction of travel.

Referring back to FIG. 2, video projection and stabilization sub-module 215B is a region of memory unit 214 configured to store instructions, that when executed by processor unit 204, cause processor unit 204 to perform various acts in accordance with applicable embodiments as described herein. In an embodiment, video projection and stabilization sub-module 215B includes instructions that, when executed by processor unit 204, cause processor unit 204 to further process the image stabilization file, as discussed above. In an embodiment, processor unit 204 may correlate individual frames of the spherical video to a particular direction of travel of the omnidirectional camera 202 while the spherical video was captured to generate a locked spherical video file. The resulting locked spherical video file may thus have a focal direction at each individual spherical video frame that is aligned with the omnidirectional camera's direction of travel. In embodiments, this reoriented focal direction may correspond to a fixed direction and/or plane. In doing so, the resulting locked spherical video file, when played back, is presented with respect to a fixed, reoriented focal direction. That is, the reoriented spherical video file, when played back, moves the focal direction of the spherical video file to a new, fixed direction that is independent of the orientation of the omnidirectional camera and the direction of travel during video recording.

Figure 6A:
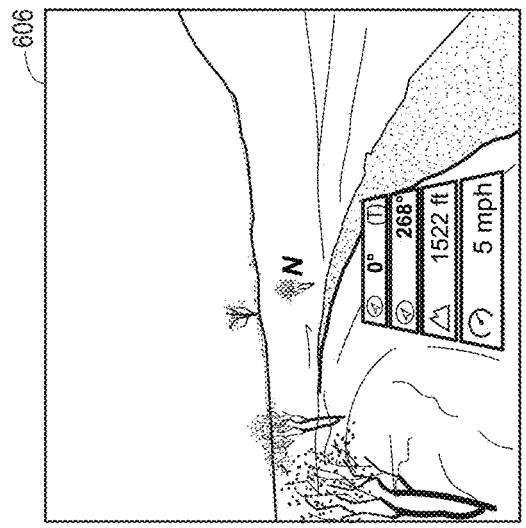
FIGS. 6A-6C illustrate examples of spherical video frames being locked to a particular focal direction during playback in accordance with embodiments of the technology.
Figure 6B:
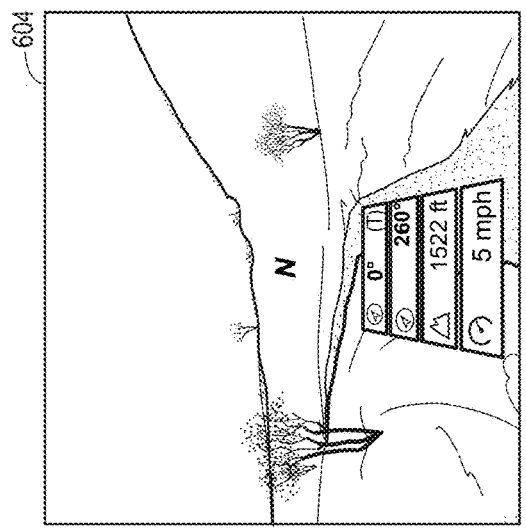
Figure 6C:
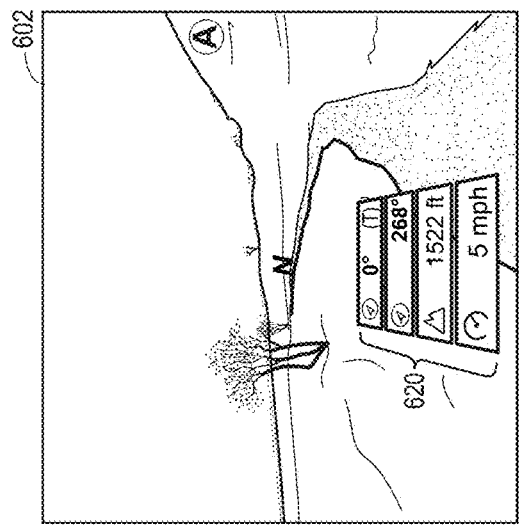

FIGS. 4A-4C and 6A-6C further illustrate the differences in how the originally recorded spherical video and the locked spherical video file differ when presented in an equirectangular format. Again, FIGS. 4A-4C illustrate examples of spherical video frames without the focal direction of the omnidirectional camera being reoriented. FIGS. 6A-6C, however, further illustrate examples of spherical video frames being locked to a particular focal direction during playback in accordance with embodiments of the technology.

As discussed above, the fixed focal direction 330 of FIG. 3B may be in any particular fixed direction (e.g., north). FIGS. 6A-6C include equirectangular video frames 602, 604, and 606, which correspond to the same time instants as equirectangular video frames 402, 404, and 406, respectively, as shown in FIGS. 4A-4C. However, equirectangular video frames 602, 604, and 606 are presented such that each focal direction is aligned to north, as shown by the alignment in each of equirectangular video frames 602, 604, and 606 to the "N" directional designation corresponding to fixed focal direction 330 of FIG. 3B.

Although FIGS. 6A-6C illustrate the spherical video being reoriented to a fixed direction, in this case north, embodiments include the spherical video being reoriented to any suitable fixed direction. For example, as shown in FIG. 6A, the equirectangular video frame 602 includes a landmark labeled "A," which is near a mountain peak. A user may wish to reorient the spherical video file such that, when it is played back, the reoriented spherical video has a focal direction that is aligned with the geographic location of landmark "A." Thus, when the reoriented spherical video is played back, it is reoriented to have a field of view aligned with the landmark "A" regardless of the user's direction of travel or the orientation of the omnidirectional camera 202 while the spherical video was recorded. In various embodiments, the focal direction associated with the landmark "A" (or another suitable fixed focal direction) may be specified, for example, before, during, or after the spherical video is recorded. To provide an illustrative example, a user may view the originally recorded spherical video after it has been captured on an external computing device 250, pan the video to a particular direction, and then specify that direction as the new focal direction. Upon doing so, embodiments include processor unit 252 to generating the reoriented spherical video file having a field of view aligned with this new, specified focal direction.

In an embodiment, the reoriented spherical video may be further reoriented such that the focal direction is "locked" to a particular plane within the three-dimensional region such as the horizon. Alternatively, the reoriented spherical video may be "locked" to a plane other than the horizon, such as a sloped surface on which a skier wearing a helmet to which omnidirectional camera 202 is mounted. Processor unit 204 (or processor unit 252 of external computing device 250 coupled with a display used to view a spherical video), may utilize stored record-time data to calculate a slope of the terrain on which the omnidirectional camera 202 was traveling when the spherical video was recorded and to determine this slope as a plane to which the focal direction should be locked during playback. Processor unit 204 or a processor unit of computing device 250 may accomplish this, for instance, by mapping the reoriented spherical video to a plane within the spherical video that correlates to sensor data (such as gyroscope and accelerometer data measurements) indicating deviations from a horizontal plane or other reference plane on which the user traveled while recording the spherical video.

Figure 7A:
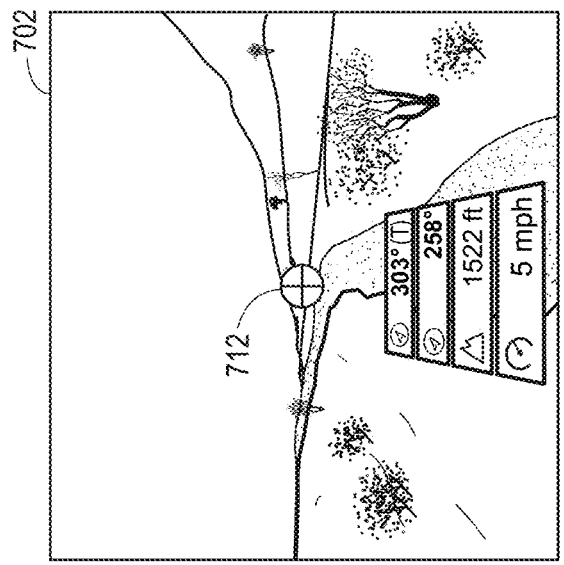
FIGS. 7A-7B illustrate examples of spherical video frames being locked to a particular plane during playback in accordance with embodiments of the technology.
Figure 7B:
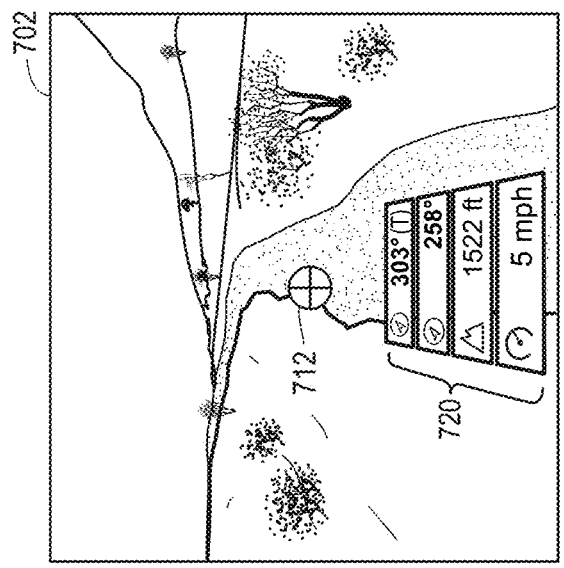

To demonstrate this, FIGS. 7A-7B illustrate examples of spherical video frames being locked to a particular plane during playback in accordance with embodiments of the technology. FIGS. 7A-7B illustrate equirectangular video frames 702 and 704, respectively, which correspond to the same time instants as one another but illustrate the effects of reorienting the video to be locked to a particular plane, in this case the horizon. Again, although FIGS. 7A-7B demonstrate the spherical video being locked to the horizon, embodiments include reorienting the spherical video to be locked to any suitable plane or fixed direction.

As shown in FIG. 7A, equirectangular video frame 702 corresponds to a single video frame of spherical video before the horizon-leveling reorientation has been applied. For instance, a cyclist may periodically tilt his head downward as he watches for potential obstacles in this path. Continuing the previous examples, this results in a focal direction that is associated with one of the camera units 208 (a primary, forward facing camera unit 208), being directed downward, as shown in FIG. 7A. However, upon the spherical video being reoriented, the focal direction and associated field of view is reoriented such that, when played back, the spherical video is reoriented to be aligned with the horizon. In other words, embodiments include the spherical video being reoriented such that, when played back, the reoriented spherical video is locked to a particular plane (e.g., the horizon), thereby functioning as a "virtual gimbal."

In various embodiments, locking the reoriented spherical video to a particular plane may be performed additionally or alternatively to the aforementioned reorientations. For example, embodiments include further aligning the spherical video to a particular plane in addition to aligning the spherical video to the focal direction corresponding to the omnidirectional camera's direction of travel, as shown in FIGS. 5A-5C. To provide another example, embodiments include further aligning the spherical video to a particular plane in addition to aligning the spherical video to a fixed direction, as shown in FIGS. 6A-6C. To provide yet another example, embodiments include aligning the spherical video to a particular plane but not otherwise reorienting the spherical video. In other words, embodiments include locking the video frames as shown in FIGS. 4A-4C to a particular plane, which have not been otherwise reoriented to a new focal direction.

Referring now back to FIG. 2, trajectory and stabilize sub-module 215A and/or video projection and stabilization sub-module 215B may further store instructions, that when executed by processor unit 204, cause processor unit 204 to perform various additional or alternate acts in accordance with applicable embodiments as described herein. In an embodiment, trajectory and stabilize sub-module 215A and/or video projection/stabilization sub-module 215B includes instructions that, when executed by processor unit 204, cause processor unit 204 to further process the spherical video to perform image stabilization. For example, processor unit 204 may generate the stabilized spherical video file using the results of the image stabilization pass, i.e., the smoothed and interpolated image stabilization file that is generated after the image stabilization has been performed on the spherical video file. This stabilized spherical video file may then be further utilized when the spherical video is played back to provide a stabilized, smooth video during the various playback modes.

For example, embodiments include further stabilizing the spherical video in addition to aligning the spherical video to the focal direction corresponding to the omnidirectional camera's direction of travel, as shown in FIGS. 5A-5C. To provide another example, embodiments include further stabilizing the spherical video in addition to aligning the spherical video to a fixed direction, as shown in FIGS. 6A-6C. To provide yet another example, embodiments include further stabilizing the spherical video but not otherwise reorienting the spherical video. In other words, embodiments include stabilizing the video frames as shown in FIGS. 4A-4C.

As detailed above, processor unit 204, or a processor unit of computing device 250 coupled with a display used to view a spherical video, may reorient a spherical video by aligning its focal direction (center point of equirectangular video frames) to a direction of travel determined based on geographic location data provided by a location-determining component 212. In various embodiments, processor unit 204 may execute instructions stored in one or more of video processing module 215, trajectory and stabilization sub-module 215A, and/or video projection and stabilization sub-module 215B to calculate one or more sensor metrics, which may be used to generate one or more graphical object overlays.

For example, as discussed herein, the geographic location data and sensor data may be logged in memory unit 214 as record-time data. Processor unit 204 (or processor unit 252 of external computing device 250 coupled with a display used to view a spherical video) may derive various sensor metrics from this record-time data, which may be presented to the user when the reoriented spherical video file is played back. These sensor metrics may be based upon, for example, a combination of sensor data, geographic location data, and/or changes of either, or both, of these data over time. To provide some illustrative examples, the derived data may include grade (elevation change per unit distance), course (direction of travel), 2-dimensional (2D) speed (ignoring elevation changes), 3-dimensional (3D) speed (including elevation changes), etc.

For example, each of FIGS. 4A-4C, 5A-5C, 6A-6C, and 7A-7B includes a graphical object overlay 420, 520, 620, and 720 respectively. As shown in FIGS. 4A-4C, 5A-5C, 6A-6C, and 7A-7B, each of graphical object overlays 420, 520, 620, and 720 includes sensor metrics related to an instantaneous direction of travel at each time instant in comparison to true north in degrees (denoted with a "T"), an instantaneous direction of travel at each time instant with respect to magnetic north in degrees, an instantaneous elevation in feet, and an instantaneous velocity in miles per hour (mph). The graphical object overlays 420, 520, 620, and 720 are illustrated by way of example, and embodiments include the reoriented spherical video file being presented with any suitable number and/or type of graphical object overlays, which may have any suitable size and shape. Furthermore, the graphical object overlays 420, 520, 620, and 720 are illustrated as including four different sensor metrics, although it will be understood that any suitable number of sensor metrics may be included as part of any suitable number of graphical object overlays.

Referring back to FIG. 2, the omnidirectional camera 202 may record spherical video, which may be transferred to an external computing device 250 for viewing. Again, the embodiments described herein regarding processing of the originally recorded spherical video may be performed on the omnidirectional camera 202 or on the external computing device 250 upon transferring the spherical video file from the omnidirectional camera 202 to the external computing device 250. In embodiments in which the reorientation of the spherical video file is performed via the external computing device 250, the record-time data may also be transferred to the external computing device 250. As discussed with reference to FIG. 2, this data transfer may include any suitable combination of wired and/or wireless data communications. Additionally, embodiments include this data transfer occurring via an intermediary device such as a memory card reader or adapter.

Figure 8:
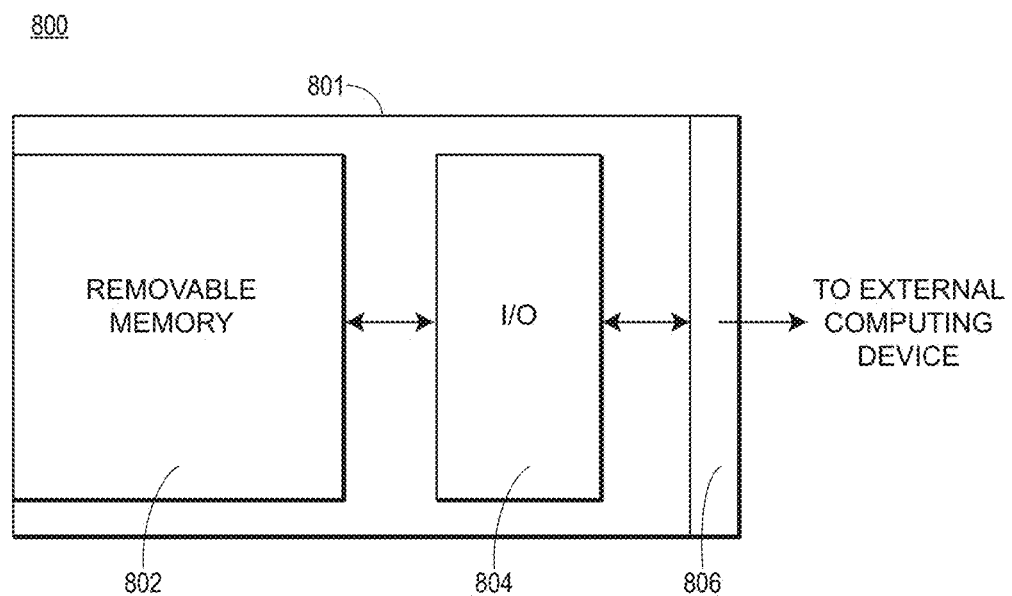
FIG. 8 is a block diagram illustrating an example data transfer device in accordance with embodiments of the technology.

To this end, FIG. 8 is a block diagram illustrating an example data transfer device in accordance with embodiments of the technology. FIG. 8 shows a data transfer device 800 that includes a housing 801, a removable memory slot 802, an input/output (I/O) block 804, and an external computing device interface 806. In embodiments, the removable memory slot 802 may be configured to accept any suitable type of memory card or other media configured to store spherical video and/or one or more data files generated by omnidirectional camera 202. For example, removable memory slot 802 may be configured to accept various versions of a secure digital (SD) card, such as a micro SD card that may be part of memory unit 114. Thus, upon a user recording spherical video, the spherical video and/or data files generated by the omnidirectional camera 202 may be stored to the removable memory, ejected from the omnidirectional camera 202, and inserted into removable memory card slot 802. As stated above, the data file and the spherical video file may be one file.

The I/O block 804 may include any suitable combination of microcontrollers, processors, memory, buffers, drivers, etc., to allow an adaptive interface between the removable memory and the external computing device 250 via interface 806 to allow the contents of the removable memory card to be transferred to memory associated with the external computing device 250. Similarly, interface 806 may include any suitable combination of drivers, controllers, memory buffers, etc., to facilitate communications between the external computing device 250 and the removable memory inserted into the removable memory slot 802. To provide an illustrative example, the external computing device 250 may be a laptop computer having a Universal Serial Bus (USB) port, and thus the interface 806 may function to support USB communications between the laptop and the data transfer device 800. Thus, upon inserting the data transfer device 800 into the USB port of the laptop, the user may download the spherical video file and any associated data files to the laptop memory, where these files may then be processed in accordance with the embodiments described herein to generate reoriented spherical video files.

The embodiments described herein refer to the spherical video file having individual frames recorded as part of a single file. However, it will be understood that the processing techniques described herein may be applied to video footage acquired from multiple lenses written to separate files as long as the video frames in each file is synchronized with respect to each particular data channel.

Moreover, some of the Figures described herein illustrate example block diagrams having one or more functional components. It will be understood that such block diagrams are for illustrative purposes and the devices described and shown may have additional, fewer, or alternate components than those illustrated. Additionally, in various embodiments, the components (as well as the functionality provided by the respective components) may be associated with or otherwise integrated as part of any suitable components.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application.

Having thus described various embodiments of the technology, what is claimed as new and desired to be protected by Letters Patent includes the following:

1. An omnidirectional camera, comprising:
   a camera unit configured to capture spherical video while the omnidirectional camera moves along a direction of travel, the spherical video having a first focal direction corresponding to an orientation of the camera unit;
   a location-determining component configured to receive signals from GPS satellites and generate geographic location data indicative of a geographic position of the omnidirectional camera based on the received signals;
   a sensor array configured to generate sensor data indicative of an orientation of the omnidirectional camera; and
   a processor unit coupled with the camera unit, the location-determining component, and the sensor array, the processor unit configured to:
      generate a data file that correlates the geographic location data and the sensor data to individual spherical video frames captured by the camera unit, the data file identifying a geographic location and orientation of the camera unit for each of the individual spherical video frames; and
      process the data file to generate a reoriented spherical video file that reorients the captured spherical video by determining a second focal direction aligned with the movement of the omnidirectional camera along the direction of travel while the spherical video was captured based on the identified geographic location and orientation of the camera unit for each of the spherical video frames.

2. The omnidirectional camera of claim 1, wherein the second focal direction is locked along a plane parallel with the horizon when the reoriented spherical video is played back.

3. The omnidirectional camera of claim 1, wherein the second focal direction is locked along a plane parallel with the direction of travel when the reoriented spherical video is played back.

4. The omnidirectional camera of claim 1, wherein the sensor array includes one or more of an accelerometer, a gyroscope, a magnetometer, and a barometer.

5. The omnidirectional camera of claim 1, further comprising:
   a memory unit configured to store the data file, and
   wherein the processor unit is further configured to include in the generated data file the geographic location data and the sensor data correlated with the individual spherical video frames.

6. The omnidirectional camera of claim 1, wherein the processor unit is further configured to calculate one or more sensor metrics from the sensor data, and to generate the reoriented spherical video file including one or more graphical objects that indicate the calculated one or more sensor metrics when the reoriented spherical video is played back.

7. The omnidirectional camera of claim 1, wherein the processor unit is further configured to interpolate the geographic location data and the sensor data over a duration of the spherical video to calculate an interpolated time-varying trajectory associated with the orientation of the omnidirectional camera along the direction of travel while the spherical video was captured, and to generate the reoriented spherical video file by mapping the individual spherical video frames to the interpolated time-varying trajectory in a time-wise manner.

8. An omnidirectional camera mounted to a user while the user moves along a direction of travel, the omnidirectional camera comprising:
   a camera unit configured to capture spherical video while the user moves along the direction of travel, the spherical video being centered about the user and having a first focal direction that corresponds to the orientation of the camera unit and deviates from the user's direction of travel;
   a location-determining component configured to receive signals from GPS satellites and generate geographic location data indicative of a geographic position of the omnidirectional camera based on the received signals;
   a sensor array configured to generate sensor data indicative of an orientation of the omnidirectional camera;
   a memory unit; and
   a processor unit coupled with the omnidirectional camera unit, the location-determining component, the sensor array, and the memory unit, the processor unit configured to:
      store the geographic location data, the sensor data, and the captured spherical video in the memory unit as a data file having a time-correlated format such that the data file identifies a geographic location and orientation of the camera unit for individual spherical video frames captured by the camera unit as the user moves along the direction of travel; and generate a reoriented spherical video file that reorients the captured spherical video when played to a second focal direction that is aligned with the user's direction of travel based on the identified geographic location and orientation of the camera unit for each of the individual spherical video frames.

9. The omnidirectional camera of claim 8, wherein the second focal direction is locked along a plane parallel with the horizon when the reoriented spherical video is played back.

10. The omnidirectional camera of claim 8, wherein the second focal direction is locked along a plane parallel with the direction of travel when the reoriented spherical video is played back.

11. The omnidirectional camera of claim 8, wherein the sensor array includes one or more of an accelerometer, a gyroscope, a magnetometer, and a barometer.

12. The omnidirectional camera of claim 8, wherein the processor unit is further configured to calculate one or more sensor metrics from the sensor data, and to generate the reoriented spherical video file including one or more graphical objects that indicate the calculated one or more sensor metrics when the reoriented spherical video is played back.

13. The omnidirectional camera of claim 8, wherein the processor unit is further configured to interpolate the geographic location data and the sensor data over a duration of the spherical video to calculate an interpolated time-varying trajectory associated with the orientation of the omnidirectional camera along the direction of travel while the spherical video was captured, and to generate the reoriented spherical video file by mapping the individual spherical video frames to the interpolated time-varying trajectory in a time-wise manner.

14. A tangible, non-transitory, computer-readable medium storing instructions on a computing device that, when executed by one or more processors associated with the computing device, cause the computing device to:
receive a spherical video file containing a spherical video having a first focal direction corresponding to an orientation of an omnidirectional camera while the omnidirectional camera was moving along a direction of travel;
receive a data file that includes geographic location data and sensor data correlated to individual spherical video frames of the spherical video file that identify a geographic location and orientation of the omnidirectional camera for each of the individual spherical video frames; and
process the spherical video file and the data file to generate a reoriented spherical video file that reorients the received spherical video by determining a second focal direction aligned with movement of the omnidirectional camera along the direction of travel while the spherical video was captured based on the identified geographic location and orientation of the omnidirectional camera for each of the individual spherical video frames.

15. The tangible, non-transitory, computer-readable medium of claim 14, wherein the second focal direction is locked along a plane parallel with the horizon when the reoriented spherical video file is played back.

16. The tangible, non-transitory, computer-readable medium of claim 14, wherein the second focal direction is locked along a plane parallel with the direction of travel when the reoriented spherical video file is played back.

17. The tangible, non-transitory, computer-readable medium of claim 14, wherein the sensor data is generated via one or more sensors associated with the omnidirectional camera and including one or more of an accelerometer, a gyroscope, a magnetometer, and a barometer.

18. The tangible, non-transitory, computer-readable medium of claim 14, wherein the spherical video file and the data file are integrated into a single file.

19. The tangible, non-transitory, computer-readable medium of claim 14, wherein the instructions, when executed by the one or more processors associated with the computing device, further cause the computing device to calculate one or more sensor metrics from the sensor data, and to generate the reoriented spherical video file including one or more graphical objects that indicate the calculated one or more sensor metrics when the reoriented spherical video file is played back.

20. The tangible, non-transitory, computer-readable medium of claim 14, wherein the instructions, when executed by the one or more processors associated with the computing device, further cause the computing device to interpolate the geographic location data and the sensor data over a duration of the spherical video to calculate an interpolated time-varying trajectory associated with the orientation of the omnidirectional camera along the direction of travel while the spherical video was captured, and to generate the reoriented spherical video file by mapping the individual spherical video frames to the interpolated time-varying trajectory in a time-wise manner.

* * * * *